United States Patent
Wishneski et al.

(10) Patent No.: US 12,043,769 B2
(45) Date of Patent: Jul. 23, 2024

(54) POLYURETHANE COMPOSITIONS WITH LOW EXPOSURE TO FREE MONOMERIC MDI ISOCYANATE CONTENT DURING SPRAY APPLICATION

(71) Applicant: BASF SE, Ludwigshafen am Rhein (DE)

(72) Inventors: Todd W. Wishneski, Missouri City, TX (US); Megan Warner Szyndler, Wyandotte, MI (US); David K. Bower, Wyandotte, MI (US); Marcus J. Hunter, Houston, TX (US); Colin A. Moore, Brownstown Township, MI (US)

(73) Assignee: BASF SE, Ludwigshafen am Rhein (DE)

(*) Notice: Subject to any disclaimer, the term of this patent is extended or adjusted under 35 U.S.C. 154(b) by 487 days.

(21) Appl. No.: 16/760,638

(22) PCT Filed: Oct. 18, 2018

(86) PCT No.: PCT/US2018/056517
§ 371 (c)(1),
(2) Date: Apr. 30, 2020

(87) PCT Pub. No.: WO2019/089237
PCT Pub. Date: May 9, 2019

(65) Prior Publication Data
US 2020/0347280 A1 Nov. 5, 2020

Related U.S. Application Data

(60) Provisional application No. 62/579,405, filed on Oct. 31, 2017.

(51) Int. Cl.
| | | |
|---|---|---|
| *C09J 175/04* | (2006.01) | |
| *B32B 37/12* | (2006.01) | |
| *C08G 18/10* | (2006.01) | |
| *C08G 18/28* | (2006.01) | |
| *C08G 18/42* | (2006.01) | |
| *C08G 18/76* | (2006.01) | |
| *C08G 101/00* | (2006.01) | |

(52) U.S. Cl.
CPC ............ *C09J 175/04* (2013.01); *B32B 37/12* (2013.01); *C08G 18/10* (2013.01); *C08G 18/2825* (2013.01); *C08G 18/4211* (2013.01); *C08G 18/7664* (2013.01); *C08G 2101/00* (2013.01)

(58) Field of Classification Search
CPC ...... B32B 37/12; C08G 18/10; C08G 18/165; C08G 18/18; C08G 18/2825; C08G 18/4018; C08G 18/4211; C08G 18/4808; C08G 18/7664; C08G 18/7671; C08G 2101/00; C08G 2150/60; C08J 9/0019; C08J 9/0038; C08K 5/0066; C08K 5/02; C08K 5/03; C08K 5/08; C09J 175/04; C09J 175/06; C09J 175/08

See application file for complete search history.

(56) References Cited

U.S. PATENT DOCUMENTS

| | | | |
|---|---|---|---|
| 6,762,214 B1 | 7/2004 | Tracy et al. | |
| 8,653,219 B2 | 2/2014 | Becker-Weimann et al. | |
| 11,149,105 B2 | 10/2021 | Van Der Puy et al. | |
| 2006/0135636 A1 | 6/2006 | Zhu et al. | |
| 2010/0152381 A1* | 6/2010 | Savino | C08G 18/8064 528/65 |
| 2011/0059255 A1 | 3/2011 | Ogonowski | |
| 2013/0119152 A1 | 5/2013 | Wishneski et al. | |
| 2014/0288201 A1 | 9/2014 | De Schrijver et al. | |
| 2015/0025164 A1* | 1/2015 | Golini | C08G 18/4018 521/107 |
| 2016/0272772 A1* | 9/2016 | Snider | C08G 18/7621 |
| 2016/0347901 A1 | 12/2016 | Burdeniuc et al. | |

FOREIGN PATENT DOCUMENTS

| | | |
|---|---|---|
| CN | 1768088 A | 5/2006 |
| CN | 101952336 A | 1/2011 |
| EP | 2481764 A1 | 8/2012 |
| KR | 10-2010-0097110 | 9/2010 |
| RU | 2366669 C2 | 9/2009 |
| RU | 2397180 C2 | 8/2010 |
| RU | 2009124295 A | 1/2011 |
| WO | 2008/066809 | 6/2008 |
| WO | 2012/101220 | 8/2012 |

OTHER PUBLICATIONS

International Preliminary Report on Patentability from counterpart International Application No. PCT/US2018/056517 dated May 14, 2020.
International Search Report and Written Opinion from counterpart International Application No. PCT/US2018/056517 dated Jan. 22, 2019.
Office Action from corresponding Russian Patent Application No. 2020117791 dated Sep. 5, 2022, along with an English summary.
Sutyagin, V.M. et al., "Uchebnoe posobie (Chemistry and Physics of Polymners, Textbook)", *Tomsk*, publ. TPU, 203, pp. 132, 140-142m 150-151m and 173, and English translation of the same.
Sonnenschein, Mark F., "Polyurethane Science, Technology, Markets, and Trends", John Wiley & Sons International Rights, Inc. p. 14.

(Continued)

*Primary Examiner* — John M Cooney
(74) *Attorney, Agent, or Firm* — Grüneberg and Myers PLLC

(57) ABSTRACT

Sprayable polyurethane compositions, in the form of spray polyurethane foams or low rise adhesives, when spray applied in the area of spray application at any given time, having monomeric MDI contents in the spray application area of no more than 20 parts per billion as measured in accordance with PEL Method 47 and having a viscosity of from 100 to 3,000 cP at 25° C. according to ASTM D2196.

21 Claims, 3 Drawing Sheets

(56) References Cited

OTHER PUBLICATIONS

Adam, Norbert et al., "Polyurethanes", *Ullmann's Encyclopedia of INdustrial Chemistry*, Wiley-VCH Verlag GmbH & Co., KgaA, vol. 29, 2012, pp. 553-554.
Office Action and Search Report from corresponding Russian Patent Application No. 2020117791 dated Apr. 19, 2022, and English summary.
Communication pursuant to Article 94(3) EP from corresponding European Patent Application No. 18800389.1 dated Apr. 30, 2021.

\* cited by examiner

POLYURETHANE COMPOSITIONS WITH LOW EXPOSURE TO FREE MONOMERIC MDI ISOCYANATE CONTENT DURING SPRAY APPLICATION

FIELD OF THE INVENTION

The instant disclosure generally relates to spray polyurethane compositions, and more particular to spray polyurethane foams and low rise polyurethane adhesives having low exposure to free monomeric MDI isocyanate content during spray application.

DESCRIPTION OF THE RELATED ART

Polyurethanes are formed by the reaction of an isocyanate, such as diphenylmethane diisocyanate (MDI), with an isocyanate-reactive compound, such as a polyol. Generally, streams of approximately equal volume of the isocyanate and the polyol are mixed in a mixing-head to form a reaction mixture, and then the reaction mixture is dispensed into a cavity or mold or otherwise onto a surface for curing. In the reaction mixture, hydroxyl (OH) functional groups of the polyol and isocyanate (NCO) functional groups of the isocyanate react (i.e., cure) to form the polyurethane. To form polyurethane foams, specifically, water-blown polyurethane foams, water is generally added to the polyol prior to reaction with the isocyanate (or added as a third distinct component during reaction). Once the isocyanate, polyol, and water are mixed, the OH functional groups of the polyol and the NCO functional groups of the isocyanate react to form a reaction mixture, and the water reacts with other NCO functional groups of the isocyanate (or another isocyanate present) to generate carbon dioxide ($CO_2$) gas in situ in the reaction mixture, which causes the reaction mixture to foam while the reaction mixture reacts to form the polyurethane.

Prepolymers have been used in place of isocyanates to decrease an amount of vaporous isocyanate when making polyurethane foams. Since isocyanates readily are generally made by reacting a diol (or a triol) with a diisocyanate, e.g. a polymeric MDI (PMDI), at an excess of NCO functional groups of the diisocyanate relative to OH functional groups of the diol (or the triol). An excess of NCO functional groups is used to insure that the prepolymer can provide enough NCO functional groups to produce foam formed from the prepolymer, such as during a subsequent reaction of the prepolymer with another polyol.

Unfortunately, since the reaction of the isocyanate component and the isocyanate-reactive component is ongoing before, during, and after spray application of the reaction mixture, a significant amount of free NCO functional groups, and in particular free NCO functional groups in monomeric isocyanate, in particular monomeric MDI, are present in the area in which the reaction mixture is applied, even when the isocyanate used is in the form of an isocyanate prepolymer. As such, industrial hygiene problems can arise when such monomeric isocyanates are present. Generally, monomeric isocyanates are vaporous, due to their increased volatility relative to polymeric isocyanates. As described above, isocyanates are generally known to be an irritant when inhaled and sensitization of eyes, skin, and respiratory systems upon contact and with repeated exposure. As a result, the Occupational Safety and Health Administration (OSHA) has set Permissible Exposure Limits (PELs) for isocyanate components. These limits are not supposed to be exceeded at any time in a workspace. The PEL for methylene diphenyl diisocyanate (i.e., the permissive exposure limit of monomeric MDI content) is 0.2 mg/m³ (~20 parts per billion (ppb)) at any given time. In addition, the American Conference of Governmental Industrial Hygienists (ACGIH) has established Threshold Limit Values (TLVs) for airborne concentrations of isocyanate components to which a worker may be consistently exposed for an eight hour period (i.e., the TLV-TWA) with no adverse health effects. The ACGIH TLV-TWA (threshold limit value–time weighted average) for monomeric MDI content is 0.051 mg/m³ (~5 ppb), as calculated or otherwise measured for an 8-hour time period. Many methods used to measure MDI emissions are the result of industrial hygiene practices and hands on experience by the industry Trade Associations (e.g. III, CPI and the Diisocyanate Panel of the ACC). Typically, a modification of the OSHA Method 47 (OSHA Method ORG-47, July 1984; Revised March 1989, referred to hereinafter as "PEL Method 47" for ease of description), using impingers backed up with 13 mm filters, can be used and can allow greater sensitivity and capture of the aerosol, both in the impinger and filter, for subsequent analysis. Recently, new methods to measure MDI in air utilize a dry, solvent-free sampler with di-n-butylamine, following the ISO 17734-1:2013 method. These samplers are also referred to as Asset EZ4-NCO samplers.

Typically, sprayable SPF compositions and LRA compositions produce amounts of isocyanate components, and specifically monomeric MDI contents, in the air that exceed both the established PELs and TLVs (or TLV-TWA) thus requiring use of respirators, expensive engineering controls, and other protective equipment.

In view of the foregoing, there remains opportunities to reduce exposure (in terms of PEL and TLV-TWA) to monomeric MDI upon spray application of polyurethane compositions, and specifically to spray polyurethane foam (SPF) compositions and low rise polyurethane adhesive (LRA) compositions such as those used in the construction industry, thereby providing reduction in workplace exposure and speed of production.

SUMMARY OF THE INVENTION AND ADVANTAGES

The instant disclosure discloses a sprayable polyurethane composition, in the form of a spray polyurethane foam composition or a low rise adhesive composition, having a monomeric MDI content of no more than 50 parts per billion, 40 parts per billion, 30 parts per billion, or 20 parts per billion when spray applied in an area of spray application, at any time as measured in the area of spray application in accordance with PEL Method 47. In addition, in certain embodiments, this sprayable polyurethane compositions also has a monomeric MDI content of no more than 20 parts per billion, 15 parts per billion, 10 parts per billion, or 5 parts per billion in a time weighted average (TLV-TWA) over an eight hour time period as measured in accordance with PEL Method 47 in the same area of spray application.

In one embodiment, the polyurethane composition is a sprayable polyurethane foam composition comprising:
an isocyanate component having free isocyanate-functional groups and comprising, based on the total weight of the isocyanate component:
    from 50 to 100 weight percent of an isocyanate-containing compound comprising polymeric diphenylmethane diisocyanate (PMDI), wherein a monomeric diphenylmethane diisocyanate (monomeric MDI) content of said PMDI ranges from 10 to 90 weight percent based on 100 parts by weight of said PMDI, and from 0 to 50 weight percent of a first isocyanate-reactive component having one or more hydroxyl-functional groups per molecule reactive with said isocyanate groups of said isocyanate component; and a second isocyanate-reactive component having one or more hydroxyl-functional groups reactive with said free isocyanate-functional groups of said isocyanate component, wherein the ratio of free isocyanate-functional groups of said isocyanate component to said hydroxyl-functional groups of said second-reactive isocyanate-reactive component ranges from 0.20:1 to 3.0:1, said second isocyanate-reactive component comprising, based on the total weight of the second isocyanate-reactive component:

from 20 to 90 weight percent of a hydroxyl-functional polymer component having an average hydroxyl functionality, per molecule, of from 1.5 to 7, said hydroxyl-functional polymer component comprising, based on the total weight of the hydroxyl-functional polymer component:

from 0 to 40 weight percent of a fire retardant component,
from 1 to 10 weight percent of a silicone surfactant,
from 0 to 20 weight percent of a diamine;
from 0.5 to 15 weight percent of a catalyst, and
from 0 to 25 weight percent of a first blowing agent; and wherein the viscosity of the sprayable polyurethane foam composition, when spray applied in the area of spray application, is from 100 to 3,000 cP at 25° C. according to ASTM D2196, and wherein the monomeric MDI content of the sprayable polyurethane foam composition, when spray applied in the area of spray application, is no more than 50 parts per billion in the area of spray application in any time period as measured in accordance with PEL Method 47.

In another embodiment, the polyurethane composition is a sprayable low rise adhesive composition comprising:

an isocyanate component having free isocyanate-functional groups and comprising, based on the total weight of the isocyanate component:

from 50 to 100 weight percent of an isocyanate-containing compound comprising polymeric diphenylmethane diisocyanate (PMDI), wherein a monomeric diphenylmethane diisocyanate (monomeric MDI) content of said PMDI ranges from 10 to 90 weight percent based on 100 parts by weight of said PMDI, and from 0 to 50 weight percent of a first isocyanate-reactive component having one or more hydroxyl-functional groups per molecule reactive with said isocyanate groups of said isocyanate component; and a second isocyanate-reactive component having one or more hydroxyl-functional groups reactive with said free isocyanate-functional groups of said isocyanate component, wherein the ratio of free isocyanate-functional groups of said isocyanate component to said hydroxyl-functional groups of said second-reactive isocyanate-reactive component ranges from 0.75:1 to 3.0:1, said second isocyanate-reactive component comprising, based on the total weight of the second isocyanate-reactive component:

from 25 to 90 weight percent of a hydroxyl-functional polymer component having an average of from 1.5 to 7 hydroxyl groups per molecule, from 0 to 5 weight percent of an ethylene diamine-initiated polyether polyol crosslinker having an average of 4 hydroxyl groups per molecule;

from 0 to 10 weight percent of a glycerine-initiated or dipropylene glycol-initiated polyether polyol crosslinker having an average of 2 to 3 hydroxyl groups per molecule and having a weight average molecular weight ranging from 25 to 6,000 g/mol;

from 0.5 to 5 weight percent of a silicone surfactant,
from 25 to 75 weight percent of a primary amine, and
from 0.15 to 20 weight percent of water, wherein the viscosity of the sprayable low rise adhesive composition, when spray applied in the area of spray application, is from 100 to 3,000 cP at 25° C. according to ASTM D2196, and wherein the monomeric MDI content of the sprayable low rise adhesive composition, when spray applied in the area of spray application, is no more than 50 parts per billion in the area of spray application in any time period as measured in accordance with PEL Method 47.

In further embodiments, the sprayable monomeric MDI content of the sprayable foam polyurethane composition, or the sprayable low rise adhesive, in addition to meeting the OSHA's PEL standards of no more than 20 ppb at any given time measured in accordance with PEL Method 47, also produces a time weighted average monomeric MDI content value over an eight hour period (TLV-TWA) of no more than 5, and alternatively less then 4, 3, 2, or 1, parts of the monomeric MDI per one billion parts of air (ppb) as also measured in accordance with PEL Method 47, as established by ACGIH TLV-TWA, when spray applied and measured under the same conditions.

In still further embodiments, a corresponding method for forming a multi-layer structure for construction applications using the spray polyurethane foam composition or low rise adhesive composition is also provided, in which the monomeric MDI content of the respective compositions, when applied within the spray application area, is no more than 50 parts per billion, 40 parts per billion, 30 parts per billion, or 20 parts per billion in the area of spray application in any time period and is no more than 20 parts per billion, 15 parts per billion, 10 parts per billion, or 5 parts per billion in the area of spray application as a time weighted average in an eight hour time period after spray application.

The instant disclosure also provides a polyurethane spraying system used, in conjunction with the formulations of the spray polyurethane foam composition or low rise adhesive composition, to minimize emissions of monomeric MDI content of the isocyanate component in the area of spray application to no more than 50 parts per billion, 40 parts per billion, 30 parts per billion, or 20 parts per billion, as measured in the area of spray application in accordance with PEL Method 47, while spraying the respective spray polyurethane foam composition and low rise adhesive composition onto a substrate material.

The instant disclosure thus solves an environmental issue surrounding the exposure to monomeric MDI upon spray application as governed by OHSA and ACGIH (the American Conference of Governmental Industrial Hygienists), as well as various state environmental agencies. With the risk of exposure to monomeric MDI substantially reduced, workplace productivity (in terms of quicker reoccupancy times) and speed of construction can increase.

DETAILED DESCRIPTION OF THE INVENTION

Figure 1:
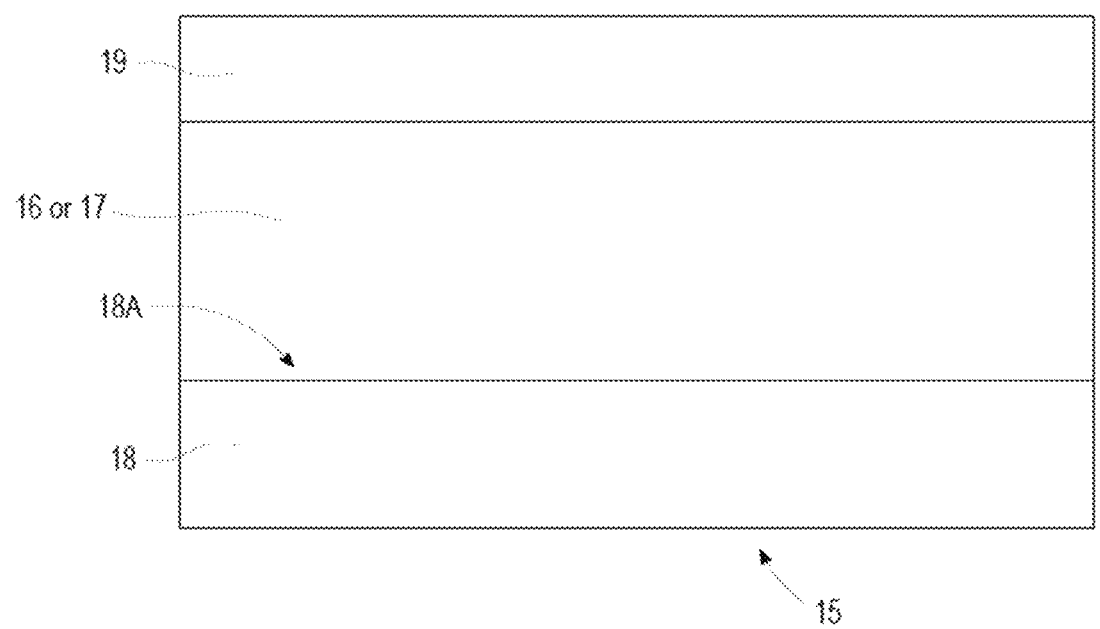
FIG. 1 is a perspective view of a multi-layered structure in accordance with alternative embodiments of the instant disclosure.

The instant disclosure relates to sprayable polyurethane compositions, and in particular sprayable polyurethane compositions in the form of spray polyurethane foam (SPF) compositions and low rise adhesive (LRA) compositions, that are formulated to minimize emissions of a monomeric diphenylmethane diisocyanate (monomeric MDI), in an area of spray application, while spraying a mixture of an isocyanate component and isocyanate reactive component (sometimes otherwise referred to herein as a resin component or resin composition) onto a surface. The instant disclosure also relates to associated methods for minimizing such emissions while spraying these compositions, and to spray application systems for spraying such compositions. The terminology "emissions" refers to an amount or concentration of the monomeric MDI present in air within an area of spray application as produced from spraying the mixture. Typically, the emissions are measured within the area of spray application after approximately 20, 19, 18, 17, 16, 15, 14, 13, 12, 11, 10, 9, 8, 7, 6, 5, 4, 3, 2, or 1, minutes of continuous spraying of the mixture. However, the measurement of the emissions need not be limited to this time and may occur at any time after spraying. It is also to be understood that the measurement of the emissions may occur at ground level, below grade, or at a heightened position within the area of spray application such as when on a scaffold or ladder. Alternatively, the emissions are measured within the area of spray application at 1, 2, 3, 4, 5, 6, 7, 8, 9, 10, 11, 12, 13, 14, 15, 16, 17, 18, 19, or 20, feet from the ground.

Spraying the mixture of the sprayable polyurethane composition of the instant disclosure (including the SPA composition or the LRA composition of the instant disclosure) onto the surface produces no more than 20, and alternatively less then 20, 15, 10, 9, 8, 7, 6, 5, 4, 3, 2, or 1, parts of the monomeric MDI per one billion parts of air (ppb), as measured within an area of spray application (typically a semicircle) emanating from the surface, to meet the OSHA standards for Permissible Exposure Limit (PEL) of no more than 20 ppb at any time period, as measured in accordance with the procedure described in OSHA's PEL Method 47.

In PEL Method 47 (OSHA Method ORG-47, July 1984, Revised March 1989), samples are collected by placing a sampler within the area of spray application and drawing a known volume of air through a glass filter coated with 1.0 mg of 1-(2-pyridyl)piperazine (1-2-PP) which is contained in an open-face cassette. Samples are extracted with a 90/10 (v/v) of acetonitrile/dimethyl sulfoxide (ACN/DMSO) and analyzed by high performance liquid chromatography (HPLC) using ultraviolet (UV) or fluorescence detector. In alternative methods, samples may be collected and analyzed for monomeric MDI content according to the method described in ISO 17734-1:2013 using Asset EZ4-NCO samplers, or by any other method recognized by those skilled in the art of measuring monomeric MDI content. Collectively, as referred to hereinafter, the method described as PEL Method 47 is meant to encompass the industry accepted methods for measuring monomeric MDI content in general accordance with the specific method detailed above.

In further embodiments, in addition to meeting the OSHA's PEL standards of no more than 20 ppb, as described above, spraying the mixture onto the same surface in accordance with the same procedure described above over an eight hour time period, produces a threshold limit value–time weighted average (i.e., TLV-TWA) of no more than 5, and alternatively less then 4, 3, 2, or 1, parts of the monomeric MDI per one billion parts of air (ppb). Accordingly, in certain embodiments, in addition to meeting the OSHA's PEL standards of no more than 20 ppb, as described above, the sprayable polyurethane compositions of the instant disclosure also meet the standards for TLV-TWA as established by ACGIH.

The semicircle in which the sampler is placed (i.e., the spray application area, as defined herein) for measuring the emissions according to PEL Method 47 may have any radius, e.g. 1, 2, 3, 4, 5, 6, 7, 8, 9, 10, 11, 12, 13, 14, 15, 16, 17, 18, 19, 20, 25, 30, 35, 40, 45, or 50, feet (with 1 foot being approximately 0.3048 meters). In one embodiment, the sampler is placed within the semicircle having a radius of 10 feet measured from the surface. In another embodiment, the measurement of emissions from the sampler occurs within the semicircle emanating from the surface and having a radius of 2 feet measured from the surface.

In the embodiments described herein, as an alternative to measuring monomeric MDI content in accordance with PEL Method 47, monomeric MDI content measurements may be determined in accordance with other industry acceptable standards, with little variance in the measured monomeric MDI content, as is known to those of ordinary skill. By way of example, monomeric MDI content may be measured using an Asset EZ4-NCO sampler following the ISO 17734-1:2013 Method (Fourth Edition, 8/15/94; which corresponds to the PEL Method 47). Accordingly, as referred to herein and corresponding to the subject matter as claimed in the instant disclosure, the "PEL Method 47" collectively refers generally to each of the industry acceptable standards known to those of ordinary skill, and not just to the specific method described in OHSA Method ORG-47 as noted above, although for the purposes of the present invention the OHSA Method ORG-47 (PEL Method 47) is the method utilized for purposes of the present application.

The surface (referred to in FIG. 2 as a surface 18A of a first substrate material 18) upon which the mixture is sprayed may be any surface but is typically a surface of a residential or commercial structure or building, such as a single or multiple family home, a modular home, or a business, that typically has at least three walls, a floor, and a roof. Most typically, the surface is a wall, floor, or ceiling of the building. In one embodiment, the surface is a roof of a building and the mixture is sprayed on the surface of the roof of the building on-site, i.e., at a construction location. In conjunction therewith, a covering material (referred to below as a second substrate material 19), such as a roofing membrane or other thermoplastic material, is applied to the sprayed mixture such that the mixture bonds the covering material to the surface of the roof. In another embodiment, there can be board to board bonding. In another embodiment, the surface (S) is a wall of a building and the mixture is sprayed onto the wall either before or after the wall is installed in the building. The surface upon which the mixture is sprayed may be, but is not limited to, brick, concrete, masonry, dry-wall, sheetrock, plaster, metal, stone, wood, plastic, a polymer composite, or combinations thereof. It is also contemplated that the surface upon which the mixture is sprayed may be a surface of a vehicle or machine component.

The instant disclosure includes the steps of formulating the spray polyurethane foam (SPF) composition and the low rise adhesive (LRA) composition, including providing an isocyanate component and an isocyanate reactive component and the various other components that are used to form each of these respective compositions. In other words, the isocyanate component and the isocyanate-reactive component and various other components are supplied for use making the formulations. Typically, the isocyanate component and the isocyanate-reactive component and various other components are formulated off-site and then delivered to an area (i.e., the spray application area) where they are used. The instant disclosure also includes the steps of applying the SPF composition and LRA composition to a surface of a substrate using appropriate spray application equipment. The methods for formulating and spraying the formulations using the appropriate spray application equipment are provided below.

In one embodiment of the subject invention, the polyurethane composition is in the form of a sprayable polyurethane foam (SPF) composition. In another embodiment of the subject application, the polyurethane composition is in the form of a sprayable low rise adhesive (LRA) composition. Each of the SPF compositions and LRA compositions according to the subject application are discussed in detail below.

1. Sprayable SPF Composition

As noted above, in one embodiment of the subject invention, the polyurethane composition is in the form of a sprayable polyurethane foam (SPF) composition. More specifically, the SPF composition, according to one exemplary embodiment, comprises:

an isocyanate component having free isocyanate-functional groups and comprising, based on the total weight of the isocyanate component:
  from 50 to 100 weight percent of an isocyanate-containing compound comprising polymeric diphenylmethane diisocyanate (PMDI), wherein a monomeric diphenylmethane diisocyanate (monomeric MDI) content of said PMDI ranges from 10 to 90 weight percent based on 100 parts by weight of said PMDI, and
  from 0 to 50 weight percent of a first isocyanate-reactive component having one or more hydroxyl-functional groups per molecule reactive with said isocyanate groups of said isocyanate component; and
a second isocyanate-reactive component having one or more hydroxyl-functional groups reactive with said free isocyanate-functional groups of said isocyanate component, wherein the ratio of free isocyanate-functional groups of said isocyanate component to said hydroxyl-functional groups of said second-reactive isocyanate-reactive component ranges from 0.20:1 to 3.0:1, said second isocyanate-reactive component comprising, based on the total weight of the second isocyanate-reactive component:
  from 20 to 90 weight percent of a hydroxyl-functional polymer component having an average hydroxyl functionality, per molecule, of from 1.5 to 7, said hydroxyl-functional polymer component comprising, based on the total weight of the hydroxyl-functional polymer component:
  from 0 to 40 weight percent of a fire retardant component,
  from 1 to 10 weight percent of a silicone surfactant,
  from 0 to 20 weight percent of a diamine;
  from 0.5 to 15 weight percent of a catalyst, and
  from 0 to 25 weight percent of a first blowing agent; and
  wherein the viscosity of the sprayable polyurethane foam composition, when spray applied in the area of spray application, is from 100 to 3,000 cP at 25° C. according to ASTM D2196, and
  wherein the monomeric MDI content of the sprayable polyurethane composition, when spray applied in the area of spray application, is no more than 50 parts per billion in the area of spray application in any time period as measured in accordance with PEL Method 47.

In further embodiments, the sprayable monomeric MDI content of the sprayable foam polyurethane composition, in addition to meeting the OSHA's PEL standards of no more than 20 ppb at any given time measured in accordance with PEL Method 47, also produces a time weighted average monomeric MDI content value over an eight hour period (TLV-TWA) of no more than 5, and alternatively less then 4, 3, 2, or 1, parts of the monomeric MDI per one billion parts of air (ppb) as also measured in accordance with PEL Method 47, as established by ACGIH TLV-TWA, when spray applied and measured under the same conditions.

In further embodiments, the sprayable polyurethane foam composition when spray applied in the area of spray application, has a viscosity of from 100 to 3,000 cP, such as from 200 to 2,500 cP, such as between 200 to 2,500 cP, such as from 200 to 2,000 cP, at 25° C. as measured according to ASTM D2196.

The term "when spray applied in the area of spray application" as it relates to the defined viscosity, with respect to the instant disclosure, refers to the viscosity of the respective spray polyurethane composition (the SPF composition described previously or the LRA composition described further below), or component described in these respective compositions, immediately prior to the spray polyurethane composition being spray applied to a particular substrate in accordance with the instant disclosure.

As provided herein, reference to the viscosity of the particular components used for forming of the sprayable polyurethane compositions (including the SPF composition or LRA composition) of the present invention, or of mixtures of components of the present invention, refers to viscosities as measured at 25° C. in accordance with the method of ASTM standard D2196-15 on a Brookfield-type rotational viscometer, with such measurements expressed in units as centipoise (cP, with one cP equal to one millipascal-second (mPa·s)). For ease of description, the measurement may be more simply described herein as ASTM standard D2196.

Still further, in certain embodiments, the isocyanate component and the second isocyanate-reactive component of the SPF composition each have a respective viscosity of from 100 to 3,000 cP, such as from 200 to 2,500 cP, such as between 200 to 2,500 cP, such as from 200 to 2,000 cP, at 25° C. as measured according to ASTM D2196.

Still further, in certain embodiments, the SPF composition also includes a viscosity reducer that is present in an amount of from greater than 0 to 30 weight percent based on the total weight of the SPF composition.

Even still further, in certain embodiments, the SPF composition also includes a second blowing agent present in an amount of from greater than 0 to 30 weight percent or 0 to 20 weight percent based on the total weight of the SPF composition.

Each of the representative components of the SPF composition, in each of their respective relative amounts, is described in further detail immediately below.

a. Isocyanate Component

As noted above, in each of the respective formulations for the SPF composition, an isocyanate component is included which comprises an isocyanate-containing compound and optionally includes a first isocyanate-reactive component, a blowing agent (referred to herein as a second blowing agent, so as to distinguish it from the first blowing agent that may be included in the first isocyanate-reactive component), and a viscosity reducer.

The isocyanate component includes free isocyanate-functional groups (free NCO-functional groups) that react with free hydroxyl-functional groups (free OH-functional groups) from the first and second isocyanate-reactive components to form carbamate (i.e., urethane) linkages, and hence form a polyurethane composition (i.e., a polymer composition have urethane linkages (sometimes referred to as urethane bonds).

In certain embodiments, the isocyanate component has a viscosity from 100 to 8,000 cP (centipoise), such as from 100 to 3,000 cP, such as no greater that 2,500 cP, such as from 200 to 2,500 cP, such as from 200 to 2,000 cP, at 25° C. as measured according to ASTM D2196. In this way, the first isocyanate component is liquid enough to be sprayed though spray application equipment associated with spraying SPF compositions.

i) Isocyanate-Containing Compound

As noted above, the isocyanate component includes an isocyanate-containing compound (i.e., an NCO group containing compound).

In certain embodiments, the isocyanate-containing compound (i.e., an NCO-group containing compound) of the isocyanate component comprises polymeric diphenylmethane diisocyanate (PMDI).

In certain of these embodiments, PMDI is present as the isocyanate-containing compound to provide reactive isocyanate-functional groups, i.e., NCO groups, during polyurethane formation reactions, as set forth in more detail below. PMDI is typically a mixture of oligomeric diphenylmethane diisocyanates, i.e., a mixture of monomeric MDI and its dimer and/or trimer (this mixture is collectively referred to hereinafter as PMDI unless otherwise indicated). PMDI also comprises a crude MDI having three or more benzene rings including NCO groups. PMDI is typically obtained through the condensation of aniline and formaldehyde in the presence of an acid catalyst, followed by phosgenation and distillation of a resulting polymeric amine mixture.

In certain embodiments, PMDI is present as the isocyanate-containing compound in the isocyanate component in an amount of from about 50 to about 100, more typically from parts by weight based on 100 parts by weight of the total weight of the isocyanate component. Stated another way, PMDI is present and comprises from 50 to 100 weight percent based on the total weight of the isocyanate component.

As noted above, PMDI typically includes a monomeric diphenylmethane diisocyanate (monomeric MDI) component as a part of its mixture. As understood in the art, the terminology "monomeric MDI" denotes a component encompassing one or more of the possible diphenylmethane diisocyanate (MDI) isomers, such as 2,4'-MDI, 4,4'-MDI, and/or 2,2'-MDI. The monomeric MDI component of the PMDI of the instant disclosure typically comprises 2,4'-MDI and 4,4'-MDI. As compared to 4,4'-MDI, 2,4'-MDI is an asymmetrical molecule and provides two NCO groups of differing reactivities.

The monomeric MDI component is typically present in PMDI in an amount of from about 5 to about 60, preferably from about 5 to about 43 parts by weight based on 100 parts by weight of the PMDI. In terms of the breakdown of the components of the PMDI mixture, in certain embodiments, the 4,4'-MDI is present in the PMDI mixture in an amount of from about 10 to about 50, more typically from about 30 to about 48, even more typically from about 39 to about 45 parts by weight based on 100 parts by weight of PMDI. Generally, the remainder of the monomeric MDI component comprises 2,4'-MDI.

In certain embodiments, other isocyanates in addition to or partially substituting for the polymeric and monomeric isocyanates components of the PMDI may be utilized as a portion of the isocyanate-containing compound of the isocyanate component, including commonly known aromatic, aliphatic, cycloaliphatic and/or aralaliphatic isocyanates such as, for example, 1,5-naphthylene diisocyanate (NDI), 2,4- and/or 2,6-tolylene diisocyanate (TDI), 3,3'-dimethyl-biphenyl diisocyanate, 1,2-diphenylethane diisocyanate and/or phenylene diisocyanate, tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclo-hexane (isophorone diisocyanate, IPDI), 1,4- and/or 1,3-bis (isocyanatomethyl)cyclohexane (HXDI), 1,4-cyclohexane diisocyanate, 1-methyl-2,4- and/or –2,6-cyclohexane diisocyanate and/or 4,4'-, 2,4'- and 2,2'-dicycohexylmethane diisocyanate (HI MDI). In addition, isocyanate prepolymers, including those formed from the above mentioned other isocyanates, as are known in the art are contemplated. Such additional isocyanates, if present in addition to PMDI as described above, comprise from 0 to 100, such as from 20 to 80 weight percent of the total weight of the isocyanate component.

In certain embodiments, the monomeric MDI component of the PMDI is modified and stabilized utilizing carbodiimide chemistry, wherein a portion of the monomeric MDI component is reacted to yield a carbodiimide-modified isocyanate with a free-NCO weight between 29.2% and 29.5%. The carbodiimide-modification leads to the formation of a 3-functional uretonimine species within the remaining difunctional monomeric MDI component.

Suitable commercially available versions of PMDI include M10, M20, Iso 277, and M70L, each commercially available from BASF Corporation of Florham Park, New Jersey In certain embodiments, the isocyanate-containing compound of the isocyanate component consists essentially of the PMDI and the monomeric MDI component (unmodified and/or carbodiimide modified).

In certain embodiments, the isocyanate-containing compound has a viscosity of from 100 to 3,000 cP (centipoise), such as no greater that 2,500 cP, such as from 200 to 2,500 cP, such as from 200 to 2,000 cP, at 25° C. as measured according to ASTM D2196., 000 cP, such as no greater than about 2,500 cP, at 25° C. according to ASTM D2196.

ii). First Isocyanate Reactive Component

In certain embodiments, the isocyanate component for the SPF composition also includes a first isocyanate-reactive component that is present in amounts of greater than 0 and less than or equal to 50 weight percent based on the total weight of the isocyanate component.

In these embodiments, a portion of the isocyanate-functional (NCO-functional) groups from PMDI or the monomeric MDI of the isocyanate-containing compound react with the hydroxyl-functional groups present in the first isocyanate-reactive component to form carbamate linkages (i.e., urethane groups), and thus the isocyanate component can also be classified as being at least partially in the form of an isocyanate prepolymer. Because the number of NCO-functional groups from the isocyanate-containing compound is in excess of the number of hydroxyl-functional groups from the first isocyanate-reactive component, the isocyanate prepolymer still includes free NCO-functional groups, in the form of PMDI or monomeric MDI, that can subsequently react with the second isocyanate-reactive component, as will be described further below.

The first isocyanate reactive component, as noted above, is a polymer component (i.e., a polymeric material) having one or more hydroxyl-functional groups ("OH-functional groups") per molecule. Typically, the first isocyanate-reactive component has a hydroxyl content of at least 25 mg KOH/g. In one embodiment, the first isocyanate-reactive component has a hydroxyl content of from 400 to 550 mg KOH/g.

The first isocyanate-reactive component also typically has a viscosity of from 100 to 3,000 cP (centipoise), such as no greater that 2,500 cP, such as from 200 to 2,500 cP, such as from 200 to 2,000 cP, at 25° C. as measured according to ASTM D2196., measured at 25° C. using a Brookfield Viscometer.

As noted above, the first isocyanate-reactive component is a polymer that include one or more hydroxyl-functional groups, typically at least two OH-functional groups. Accordingly, the hydroxyl-functional polymers having one OH-functional group (i.e., a monol), two OH-functional groups (i.e., a diol), three OH-functional groups (i.e., a triol), four OH-functional groups (i.e., a tetrol), or polymers having more than four OH-functional groups, and combinations thereof. The hydroxyl functionality of these hydroxyl-functional polymers is typically expressed in terms of an average functionality of all of the respective polymer chains present in the collective hydroxyl-functional polyether blend, and for the instant disclosure the average hydroxyl functionality of such hydroxyl-functional polymers of the first isocyanate-reactive component is greater than one (i.e., a portion of the polymer is at least a diol, a triol, a tetrol, or higher hydroxyl-functional polymer).

In certain embodiments, the hydroxyl-functional polymer of the first isocyanate-reactive component is a hydroxyl-functional polyether (i.e., hydroxyl-functional polyether-group containing polymers), while in other embodiments the hydroxyl-functional polymer is a hydroxyl-functional polyester (i.e., hydroxyl-functional polyester-group containing polymers). In yet other embodiments, the first isocyanate-reactive component hydroxyl-functional polymer can be a mixture of a hydroxyl-functional polyether and a hydroxyl-functional polyester.

Hydroxyl-functional polyethers having an average of two or more OH-functional groups per molecule are sometimes alternatively referred to as polyether polyols, which are typically formed as the polymeric reaction product of an organic oxide and an initiator compound containing two or more active hydrogen atoms. The active hydrogen compound in the presence of a base catalyst initiates ring opening and oxide addition, which is continued until the desired molecular weight is obtained. If the initiator has two active hydrogens, a diol results. If a trifunctional initiator such as glycerine is used, the oxide addition produce chain growth in three directions, and a triol results.

The hydroxyl-functional polyether of the first isocyanate-reactive component can be any type of hydroxyl-functional polyether known in the art. The hydroxyl-functional polyether can be non-ethoxylated or ethoxylated. In addition, the hydroxyl-functional polyether can be short chain, low molecular weight hydroxyl-functional polyether having one or more OH-functional groups. Particularly suitable hydroxyl-functional polyether or polyethers for use in the polyurethanes include, but are not limited to, products obtained by the polymerization of a cyclic oxide, for example ethylene oxide (EO), propylene oxide (PO), butylene oxide (BO), or tetrahydrofuran in the presence of initiator compounds having one or more active hydrogen atoms. Suitable initiator compounds including a plurality of active hydrogen atoms for use in obtaining hydroxyl-functional polyethers include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable hydroxyl-functional polyether or polyethers of the first isocyanate-reactive component include polyether diols and triols, such as polyoxypropylene diols and triols and poly(oxyethylene-oxypropylene)diols and triols obtained by the simultaneous or sequential addition of ethylene and propylene oxides to di- or tri-functional initiators. Copolymers having oxyethylene contents of from about 5 to about 90% by weight, based on the weight of the polyether polyol component, of which the polyether polyols may be block copolymers, random/block copolymers or random copolymers, can also be used. Yet other suitable hydroxyl-functional polyethers include polytetramethylene ether glycols obtained by the polymerization of tetrahydrofuran.

Particularly suitable hydroxyl-functional polyether or polyethers of the first isocyanate-reactive component include those based on a totally heteric (or random) EO, PO structure, or those having heteric, but uniform blocks of EO and PO, e.g. blocks comprising EO and blocks comprising PO. As yet another suitable example, the hydroxyl-functional polyether can have heteric blocks and uniform blocks of EO and PO, e.g. blocks comprising all EO or PO and blocks comprising random EO, PO. Still further, in certain examples, the hydroxyl-functional polyether can be heteric or random copolymers of EO and PO which are endblocked with either EO or PO. One particularly suitable hydroxyl-functional polyether comprises a polyether-triol having ethylene-oxide terminal groups.

Suitable non-limiting commercial hydroxyl-functional polyether or polyethers having an average of two OH-functional groups per molecule, sometimes referred to as polyether diols, of the first isocyanate-reactive component are based upon the propoxylation and/or ethoxylation of diethylene glycol, dipropylene glycol, ethylene glycol, or propylene glycol include Pluracol® P410R, 1010, 2010, 1062, and 1044, each commercially available from BASF Corporation of Florham Park, New Jersey. In particular, Pluracol® P410R, 1010, 2010, and 1044 are PO-containing hydroxyl-functional polyether diols, while Pluracol® 1062 is a PO-containing hydroxyl-functional polyether diols endcapped with EO.

Suitable non-limiting commercial hydroxyl-functional polyether or polyethers having an average of three OH-functional groups per molecule, sometimes referred to as polyether triols, of the first isocyanate-reactive component are based on the propoxylation and/or ethoxylation of glycerin or trimethyolpropane include Pluracol® GP430, GP730, 4156, 2090, and 816, each commercially available from BASF Corporation of Florham Park, New Jersey. In particular, Pluracol® GP430 and GP730 are PO-containing hydroxyl-functional polyether triols, Also, Pluracol® 2090 and 816 are a PO-containing hydroxyl-functional polyether triol endcapped with EO, while Pluracol® 4156 is a pure heteric hydroxyl-functional polyether triol.

Suitable non-limiting commercial hydroxyl-functional polyether or polyethers having an average of four OH-functional groups per molecule, sometimes referred to as polyether tetrols, propoxylation and/or ethoxylation of toluene diamine, ethylene diamine, and pentaerythritol of the first isocyanate-reactive component include Pluracol® 735, 736 and PEP 500 and Quadrol, each commercially available from BASF Corporation of Florham Park, New Jersey. In particular, Pluracol® 735 and 736 toluene diamine initiated hydroxyl-functional polyether polyols based on PO, Pluracol® PEP 500 is a pentaerythritol-initiated heteric, and Quadrol is an ethylene diamine initiated hydroxyl-functional polyether polyols based on PO.

One suitable non-limiting commercial higher hydroxyl-functional polyether of the first isocyanate-reactive component are based on sucrose, sorbitol or combinations thereof alone or in combination with other initiators is Pluracol® SG360 (based on sucrose and glycerin), commercially available from BASF Corporation of Florham Park, New Jersey In certain of these embodiments, the hydroxyl-functional polyether or polyethers of the first isocyanate-reactive component have a weight average molecular weight (Mw) ranging from 25 to 6,000 g/mol, as measured by gel permeation chromatography (GPC) or nuclear magnetic resonance (NMR) previously calibrated using a calibration curve based on mono-dispersed polystyrene standards.

In certain embodiments, a combination of two or more hydroxyl-functional polyethers of the first isocyanate-reactive component can be used, with each one of the two or more hydroxyl-functional polyethers having the same or a different weight average molecular weight within the range of 180 to 6,500 g/mol described above. Thus, for example, the hydroxyl-functional polyethers used may include a first hydroxyl-functional polyether having a weight average molecular weight ranging from 180 to 6,500 g/mol and a second hydroxyl-functional polyether different from the first hydroxyl-functional polyether also having a weight average molecular weight ranging from 180 to 6,500 g/mol. Representative examples of the two or more hydroxyl-functional polyethers include those described in the paragraphs above.

Suitable hydroxyl-functional polyesters of the first isocyanate-reactive component, include, for example polyester polyols such as, but are not limited to, aromatic polyester polyols, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In addition, lower molecular weight hydroxyl-functional compounds may also be utilized in the first isocyanate-reactive component, such as ethylene glycol, diethylene glycol, propylene glycol, dipropylene glycol, butane diol, glycerol, trimethylpropane, pentaerythritol, sorbitol, and combinations thereof.

In certain embodiments, the first isocyanate-reactive component having one or more hydroxyl-functional groups ("OH-functional groups") per molecule may include one or more of the following components: (1) a hydroxyl-functional aliphatic polyether having an average hydroxyl functionality, per molecule, of from 2 to 3; (2) a hydroxyl-functional aromatic polyester having an average hydroxyl functionality, per molecule, of from 2 to 3; (3) a monohydric alcohol; (4) a fire retardant having an average hydroxyl functionality, per molecule, of from 1 to 3; and (5) any combination thereof.

Suitable hydroxyl-functional aliphatic polyethers (1) that may be included in the first isocyanate-reactive component for SPF compositions include those formed from organic dicarboxylic acids having 2 to 12 carbon atoms, aliphatic dicarboxylic acids having 4 to 6 carbon atoms, or multivalent alcohols, such as diols, having 2 to 12 carbon atoms and most preferably 2 to 6 carbon atoms. Suitable non-limiting examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, terephthalic acid, and combinations thereof. Alternatively, dicarboxylic acid derivatives may also be used and may include, for example, dicarboxylic acid mono- or di-esters of alcohols having 1 to 4 carbon atoms, or dicarboxylic acid anhydrides. Typical examples of divalent and multivalent alcohols that may be used include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, and combinations thereof.

Additional suitable hydroxyl-functional aliphatic polyethers (1) that may be included in the first isocyanate-reactive component for SPF compositions can also be formed by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule preferably including from 2 to 8 and more preferably from 3 to 8, reactive hydrogen atoms. Alternatively, cationic polymerization with Lewis acids such as antimony pentachloride and boron trifluoride etherate can be used. The hydroxyl-functional aliphatic polyethers may be prepared from any initiators known in the art including, but not limited to, ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, a-methyl glucoside, sucrose, sorbitol, 2,2-bis(4-hydroxyphenyl)-propane, tetrahydrofuran and alkylene oxide-tetrahydrofuran mixtures, epihalohydrins such as epichlorohydrin, and combinations thereof. These initiators can react with any suitable alkylene oxide such as 1,3-propylene oxide, 1,2- and 2,3-butylene oxide, amylene oxides, styrene oxide, ethylene oxide, 1,2-propylene oxide, and combinations thereof.

Further suitable non-limiting examples of hydroxyl-functional aliphatic polyethers (1) that may be included in the first isocyanate-reactive component for SPF compositions include polyoxyethylene glycol, polyoxypropylene glycol, polyoxybutylene glycol, polytetramethylene glycol, block copolymers, polyoxypropylene glycol, polyoxyethylene glycol, poly-1,2-oxybutylene glycol, polyoxyethylene glycol, poly-1,4-tetramethylene glycol, polyoxyethylene glycol, copolymer glycols prepared from blends or sequential addition of two or more alkylene oxides, and combinations thereof. Suitable hydroxyl-functional aliphatic polyethers include, but are not limited to, Voranol® 370 polyol, a sucrose based hydroxyl-functional aliphatic polyethers having a hydroxyl number of approximately 370 and commercially available from Dow Chemical, and LHT-240, a polyether triol having a hydroxyl number of approximately 270 and commercially available from Covestro. Particularly suitable hydroxyl-functional aliphatic polyethers (1) having an average functionality, per molecule, ranging from 2 to 3 include Pluracol® 410, Pluracol® GP730, and Pluracol® TP 440, each available from BASF Corporation of Florham Park, New Jersey Suitable hydroxyl-functional aromatic polyesters (2) that may be included in the first isocyanate-reactive component for SPF compositions can be formed by polycondensation/esterification of organic polycarboxylic acids, e.g. aromatic polycarboxylic acids and/or derivatives thereof, and multivalent alcohols in the absence of catalysts or in an inert atmosphere such as nitrogen, carbon dioxide, or a noble gas. Alternatively, hydroxyl-functional aromatic polyesters (2) that may be included in the first isocyanate-reactive component for SPF compositions can be formed using ester by-products from the manufacture of dimethyl terephthalate, polyalkylene terephthalates, phthalic anhydride, residues from the manufacture of phthalic acid or phthalic anhydride, terephthalic acid, residues from the manufacture of terephthalic acid, isophthalic acid, trimellitic anhydride, and combination's thereof.

Particularly suitable aromatic polyesters having an average hydroxyl functionality, per molecule, ranging from 2 to 3 include Terol 250, Terol 258, Terol 1325, all commercially available from Huntsmen, and PS-4002, commercially available from Stepan.

Suitable monohydric alcohols (3) that may be included in the first isocyanate-reactive component for SPF composition can be selected from various compounds having only one hydroxyl (OH) functional group. In certain embodiments, the monohydric isocyanate-reactive component may be commonly referred to in the art as a mono-alcohol, monoalcohol, mono-ol, monool, mon-ol, or monol.

The monohydric alcohol can be selected from the group of conventional monohydric alcohols, such as branched and unbranched aliphatic, cycloaliphatic, and aromatic alcohols. In these embodiments, the monohydric alcohols typically has from 1 to 20, more typically from 1 to 16, yet more typically from 1 to 12, and most typically from 1 to 8 carbon atoms.

Examples of suitable aliphatic monohydric alcohols (3), for purposes of the instant disclosure include, but are not limited to, methanol, ethanol, propanol, isopropanol, butanol, sec-butanol, isobutanol, tert-butanol, and the various isomers of pentyl alcohol, of hexyl alcohol, of octyl alcohol (e.g. 2-ethylhexanol), of nonyl alcohol, of decyl alcohol (e.g. 2-propylheptanol), of lauryl alcohol, of myristyl alcohol, of cetyl alcohol and of stearyl alcohol, as well as the fatty alcohols and wax alcohols which occur naturally or which can be obtained by the hydrogenation of naturally occurring carboxylic acids. Cyclohexanol and its homologues are examples of suitable cycloaliphatic alcohols, for purposes of the instant disclosure. Particularly suitable monohydric alcohols include 2 ethyl-hexanol and any $C_4$-$C_{16}$ monohydric alcohol.

In certain embodiments, the monohydric alcohol (3) is a polyoxyalkylene monool. Examples of suitable polyoxyalkylene monools, for purposes of the instant disclosure, include, but are not limited to, polyoxypropylene monools, polyoxyethylene monools, polyoxyethylene polyoxypropylene monools, and combinations thereof. The aforementioned polyoxyalkylene monools can be made by the alkoxylation of a monohydric alcohol, such as one or more of the monohydric alcohols described and exemplified above. Methods of alkoxylating alcohols are well known to those skilled in the art.

In certain embodiments, the monohydric alcohols (3) may include another functional group (or groups) in addition to the OH functional group. Such functional groups, if present, essentially fail to react with the isocyanate component under the reaction conditions employed for forming the urethane linkage. These additional functional groups, if present, may be useful for subsequent or side reactions, if desired. It is to be appreciated that the monohydric alcohols may include any combination of two or more of the aforementioned alcohols and/or polyoxyalkylene monools.

In certain embodiments, the monohydric alcohol (3) is typically present in an amount of from about 0 to about 30, such as from greater than about 0 to about 30, more typically from greater than about 0 to about 15, weight percent based on 100 parts by weight of first isocyanate-reactive component.

Suitable reactive fire retardants (4) having an average hydroxyl functionality, per molecule, of from 1 to 3 that may be included in the first isocyanate-reactive component for SPF compositions include, but are not limited to, (a) an aromatic brominated compound, (b) an aliphatic brominated compound, (c) a phosphorus-containing fire retardant, and any combination thereof.

Suitable aromatic brominated compounds include Saytex PURshield (Albemarle), PHT-4 diol (Albemarle, LanXess), and tribromophenol (ICL).

Suitable aliphatic brominated compounds include tribromoneopenyl alcohol (ICL), dibromoneopentyl glycol (ICL), and Ixol M125 (Solvay).

Suitable phosphorus-containing fire retardants having an average hydroxyl functionality, per molecule, ranging from 1 to 3 that may be included in the first isocyanate-reactive component for SPF compositions include E06-16, Veriquel R100 (ICL), and Fyrol 6 (ICL).

iii) Second Blowing Agent

As noted above, in certain embodiments, the isocyanate component also includes a blowing agent (and more precisely a second blowing agent as described herein).

In such embodiments, when present, the second blowing agent is present in an amount of greater than 0 to 30 weight percent or 0 to 20 weight percent of the total weight of the isocyanate component.

Exemplary blowing agents for use as the second blowing agent include those that are a liquid under a pressure greater than atmospheric pressure. In one embodiment, the blowing agent is selected from the group consisting of volatile non-halogenated $C_2$ to $C_7$ hydrocarbons, hydrofluorocarbons, and mixtures thereof. In another embodiment, the blowing agent is a physically active blowing agent, such as a $C_1$-$C_4$ hydrofluorocarbon having a boiling point of 26° C. or less. As is known in the art, physically active blowing agents typically boil at an exotherm foaming temperature or less, most typically at 50° C. or less. Examples of particularly suitable physically active blowing agents include, but are not limited to, volatile non-halogenated hydrocarbons having two to seven carbon atoms such as alkanes, alkenes, cycloalkanes having up to 6 carbon atoms, dialkyl ether, cycloalkylene ethers and ketones, and hydrofluorocarbons (HFCs).

The blowing agent may have a zero ozone depletion potential. In other embodiments, the blowing agent has an ozone depletion potential of less than 1.1, less than 1, less than 0.8, less than 0.6, less than 0.1, or from 0.01 to 0.1. As is known in the art, the terminology "ozone depletion potential" is defined as a ratio of an impact on ozone of a first chemical compared to an impact on ozone of a similar mass of trichlorofluoromethane (R-11/CFC-11). In other words, ozone depletion potential is a ratio of global loss of ozone due to a given chemical to a global loss of ozone due to CFC-11 of the same mass.

In still other embodiments, the blowing agent is further defined as, but is not limited to, a volatile non-halogenated hydrocarbon such as a linear or a branched alkane such as butane, isobutane, 2,3-dimethylbutane, n- and isopentanes, n- and isohexanes, n- and isoheptanes, n- and isooctanes, n- and isononanes, n- and isodecanes, n- and isoundecanes, and n- and isodedecanes, alkenes such as I-pentene, 2-methylbutene, 3-methylbutene, and 1-hexene, cycloalkanes such as cyclobutane, cyclopentane, and cyclohexane, linear and/or cyclic ethers such as dimethyl ether, diethyl ether, methyl ethyl ether, vinyl methyl ether, vinyl ethyl ether, divinyl ether, tetrahydrofuran and furan, ketones such as acetone, methyl ethyl ketone and cyclopentanone, isomers thereof, and combinations thereof.

In another embodiment, the blowing agent is further defined as a hydrofluorocarbon such as difluoromethane (HFC-32), 1,1,1,2-tetrafluoroethane (HFC-134a), 1,1,2,2-tetrafluoroethane (HFC-134), 1,1-difluoroethane (HFC-152a), 1,2-difluoroethane (HFC-142), trifluoromethane, heptafluoropropane (R-227a), hexafluoropropane (R-136), 1,1,1-trifluoroethane, 1,1,2-trifluoroethane, fluoroethane (R-161), 1,1,1,2,2-pentafluoropropane, pentafluoropropylene (R-2125a), 1,1,1,3-tetrafluoropropane, tetrafluoropropylene (R-2134a), difluoropropylene (R-2152b), 1,1,2,3,3-pentafluoropropane, 1,1,1,3,3-pentafluoro-n-butane, and 1,1,1,3,3-pentafluoropentane (245fa), isomers thereof, and combinations thereof. In an alternative embodiment, the first blowing agent is further defined as 1,1,1,2-tetrafluoroethane (HFC-134a), also known as R-134a. HFC-134a has a boiling point of 247 K (−26° C. at 760 mm/Hg) and readily vaporizes at atmospheric pressure. Alternatively, the first blowing agent may be as described in U.S. Pat. No. 6,534,556, which is hereby expressly incorporated by reference relative to the blowing agents.

In preferred embodiments, the second blowing agent is selected from a hydrofluoroolefin ("HFO"), a hydrofluorocarbon ("HFC"), a hydrocarbon ("HC"), and any combination thereof as provided from the lists above. Particularly suitable hydrofluoroolefin include, but are not limited to, trans-1-chloro-3,3,3-trifluoropropene; 1,1,1,4,4,4-hexafluoro-2-butane; trans 1,3,3,3-tetrafluoroprop-1-ene; and other gaseous blowing agents such as Opteon 1150. Particularly suitable hydrofluorocarbons include 1,1,1,3,3-pentafluoropropene and 1,1,1,2,3,3,3-heptafluoropropane. Particularly suitable hydrocarbons include cyclopentane, isopentane, n-pentane, 1,1-difluoroethane and 1,2-dichloroethylene.

As noted above, the second blowing agent, when present, is typically present in an amount of from greater than 0 to 30 parts by weight or 0 to 20 parts by weight, such as from greater than 0 to 15 parts by weight, per 100 parts by weight of the isocyanate component. However, the amount of the blowing agent used typically depends on a desired density of the polyurethane foam and solubility of the blowing agent in the isocyanate component. It is desirable to minimize amounts of the blowing agent used to reduce costs.

iv) Viscosity Reducer

As noted above, in certain embodiments, the isocyanate component also includes viscosity reducer.

The viscosity reducer, when present, is typically present in an amount of from greater than 0 to 30, such as from greater than 0 to 10, parts per 100 parts by weight of the isocyanate component.

Suitable viscosity reducers include, but are not limited, to triethylphosphate ("TEP"), tris(1-chloro-2-propyl phosphate) ("TCPP"), Plastomoll DNA (diisononyl adipate, from BASF), Palatinol Series phthalate plasticizers (BASF), and trimethyl pentanyl diisobutyrate ("TXIB", Eastman Chemical Company).

b. The Second Isocyanate-Reactive Component

As noted above, the SPF composition also include a second isocyanate-reactive component.

In certain embodiments, the amount of the second isocyanate-reactive component added to the isocyanate component is set such that the ratio of free isocyanate-functional groups of the isocyanate component to the hydroxyl-functional groups of the second isocyanate-reactive component (i.e., the NCO:OH ratio) ranges from 0.20:1 to 3.0:1.

In certain embodiments, the second isocyanate-reactive component has a viscosity of 100 to 3,000 cP, such as from 100 to less than 2,000 cP, more typically of from 200 to 1,500 cP, measured at 25° C. using a Brookfield Viscometer.

In certain embodiments, the second isocyanate-reactive component comprises, based on the total weight of the second isocyanate-reactive component:

from 20 to 90 weight percent of a hydroxyl functional polymer component having an average hydroxyl functionality, per molecule, of from 1.5 to 7;

from 0 to 40 weight percent of a fire retardant component, from 1 to 10 weight percent of a silicone surfactant, from 0 to 20 weight percent of a diamine;

from 0.5 to 15 weight percent of a catalyst, and from 0 to 25 weight percent of a first blowing agent.

As noted above, in certain embodiments, the second isocyanate-reactive component includes a hydroxyl-functional polymer component having an average hydroxyl functionality, per molecule, of from 1.5 to 7 that is present in an amount of from 20 to 90 weight percent based on the total weight of the second isocyanate-reactive component.

Suitable hydroxyl-functional polymer components, having an average hydroxyl functionality, per molecule, of from 1.5 to 7, includes many of the hydroxyl-functional polymers described above with respect to the first isocyanate-reactive component, including but not limited to the hydroxyl-functional polyethers and polyesters, and combinations thereof, as described above, and herein incorporated by reference.

In certain embodiments, the hydroxyl-functional polymer component having an average hydroxyl functionality, per molecule, of from 1.5 to 7 comprises, based on the total weight of the hydroxyl-functional polymer component:

from 20 to 80 weight percent of a hydroxyl-functional aromatic polyester having an average hydroxyl functionality, per molecule, of from 1.5 to 7, from 0 to 40 weight percent of Mannich polyether polyol having an average hydroxyl functionality, per molecule, of from 2 to 3, and from 0 to 40 weight percent of polyether polyol different from the Mannich polyether polyol and having an average hydroxyl functionality, per molecule, of from 2 to 3.

In certain embodiments, the hydroxyl-functional polymer component has from greater than 0 to 40 weight percent of Mannich polyether polyol having an average hydroxyl functionality, per molecule, of from 2 to 3. In certain embodiments, the hydroxyl-functional polymer component has from greater than 0 to 40 weight percent of polyether polyol different from the Mannich polyether polyol and having an average hydroxyl functionality, per molecule, of from 2 to 3.

Suitable hydroxyl-functional aromatic polyester having an average hydroxyl functionality, per molecule, of from 1.5 to 7, include Terol 250, Terol 258, Terol 305, Terol 649, and Terol 925, each commercially available from Huntsmen Chemical.

Suitable Mannich polyether polyol having an average hydroxyl functionality, per molecule, of from 2 to 3, include Carpol MX425 and Carpol MX470 (each commercially available from Carpenter).

Suitable polyether polyols different from the Mannich polyether polyol and having an average hydroxyl functionality, per molecule, of from 2 to 3, include GSP 280 (Carpenter), SPA357 (Carpenter), Pluracol SG-370 (BASF), Pluracol SG-360 (BASF), and any glycerine-initiated polyether polyols, sucrose-initiated polyether polyols, or sucrose-amine initiated polyether polyols.

In certain embodiments, the fire retardant component includes, from 0 to 50 weight percent, such as from greater than 0 to 50 weight percent, based on the total weight of the fire retardant component, of a second reactive fire retardant component having an average of from 1 to 3 hydroxyl groups; and from 50 to 100 weight percent a non-reactive fire retardant component.

In this embodiment, the second reactive fire retardant component may be the same as the first reactive fire retardant component included in the first isocyanate-reactive component, the list of which is herein incorporated by reference. Alternatively, the second reactive fire retardant component may be different from the first reactive fire retardant component included in the first isocyanate-reactive component, but selected from the same possible species as the first reactive fire retardant component described above, the list of which is also herein incorporated by reference.

Suitable non-reactive fire retardant compositions include triethylphosphate ("TEP"), tris(1-chloro-2-propyl phosphate) ("TCPP").

The second isocyanate-reactive component includes from 0.5 to 10 weight percent (based on the total weight of the second isocyanate-reactive component), such as from 0.5 to 3 weight percent, of a silicone surfactant.

Suitable silicone surfactants include Tegostab B8453 and B84202 (Evoniku), Silstab 2580 (Siltech), Dabco DC193 (Evonik), and Silstab L6900 (Siltech).

The second isocyanate-reactive component also includes from 0 to 20 weight percent (based on the total weight of the second isocyanate-reactive component), such as from greater than 0 to 20 weight percent, such as from greater than 0 to 5 weight percent, of a diamine.

Suitable diamines include aromatic and aliphatic diamines. One suitable aromatic diamine is Ethacure 100 (diethyltoluenediamine; Albemarle).

The second isocyanate-reactive component also includes from 0.5 to 15 weight percent (based on the total weight of the second isocyanate-reactive component), such as from 2 to 8 weight percent, based on the total weight of the second isocyanate reactive component, of a catalyst.

Suitable catalysts include one or more catalysts and typically includes a combination of catalysts. In one embodiment, the catalyst includes a polyurethane curing catalyst. Typically, the polyurethane curing catalysts accelerate a reaction of the isocyanate component hydroxyl functional groups of the second isocyanate-reactive component. The polyurethane curing catalysts may also shorten tack time, promote green strength and minimize foam shrinkage. Suitable polyurethane curing catalysts include, but are not limited to, organometallic catalysts, such as organo-lead catalysts, tin, titanium, copper, mercury, cobalt, nickel, iron, vanadium, antimony and manganese catalysts, and combinations thereof. In a further embodiment, the catalyst is as described in U.S. Pat. No. 6,534,556, which is hereby expressly incorporated by reference relative to these catalysts.

Suitable polyurethane curing catalysts include, but are not limited to, tertiary amines such as triethylamine, 3-methoxy-propyldimethylamine, triethylenediamine, tributylamine, dimethylcyclohexylamine, dimethylbenzylamine, N-methyl-, N-ethyl- and N-cyclohexylmorpholine, N,N,N', N'-tetramethylethylenediamine, N,N,N',N'-tetramethylbutanediamine or-hexanediamine, N,N,N'-trimethyl isopropyl propylenediamine, pentamethyldiethylenetriamine, tetramethyldiaminoethylether, bis(-dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine dimethylethanolamine, and combinations thereof.

Particularly suitable reactive amine catalysts include Dabco T, dimethylethanolamine, and Polycat 203 and 204 (Evonik). Particularly suitable non-reactive amine catalysts include Dabco 33LV, Dabco 2040, Dabco 2039, Polcycat 12, DMDEE (2,2'-dimorpholino diethyl ester), and DMCHA (N,N-dimethylcyclohexylamine), commercially available from Evonik or other suppliers.

Particularly suitable metal catalysts, present in amounts ranging from 0 to 5% by weight of the total weight of the second isocyanate-reactive component, such as from greater than 0 to 5% by weight of the total weight of the second isocyanate-reactive component, include tin-based catalysts such as Dabco T120 (Evonik) and Fomrez UL-28 (Momentive) and/or bismuth-based catalysts such as Duroct 28% (Dura), BorchiKat 320 (Borchers), and Bicat 8842 (Sheppard). In certain embodiments, the catalyst includes from 10 to less than 15% by weight of the reactive amine catalyst, described in the previous paragraph, and from greater than 0 to 5% by weight of the metal catalyst, each based on the total weight of the second isocyanate-reactive component.

In certain embodiments, the second isocyanate-reactive component may include a first blowing agent.

Exemplary first blowing agents include each of those described above with respect to the second blowing agent and not repeated herein for brevity. Most typically, the first blowing agent and the second blowing agent are present in the SPF composition, although in other embodiment the first blowing agent is present when the second blowing agent is not present, and vice versa. In addition, the first blowing agent may also include water and formic acid.

Accordingly, in certain embodiments, the first blowing agent includes at least one of the group consisting of a hydrofluoroolefin, a hydrofluorocarbon, a hydrocarbon, water, formic acid, and any combination thereof.

Typically, the first blowing agent is present in an amount of from 0 to 25, such as from 2 to 20, more typically in an amount of from 5 to 15, and most typically in an amount of from 7 to 10 parts by weight per 100 parts by weight of the isocyanate-reactive component. However, the amount of the first blowing agent used typically depends on a desired density of the polyurethane foam and solubility of the first blowing agent in the isocyanate-reactive component. It is desirable to minimize amounts of the first blowing agent used to reduce costs.

2. Sprayable LRA Compositions

In another embodiment of the instant disclosure, the polyurethane composition is a sprayable low rise adhesive (LRA) composition comprising:

an isocyanate component having free isocyanate-functional groups and comprising, based on the total weight of the isocyanate component:
  from 50 to 100 weight percent of an isocyanate-containing compound comprising polymeric diphenylmethane diisocyanate (PMDI), wherein a monomeric diphenylmethane diisocyanate (monomeric MDI) content of said PMDI ranges from 10 to 90 weight percent based on 100 parts by weight of said PMDI, and
  from 0 to 50 weight percent of a first isocyanate-reactive component having one or more hydroxyl-functional groups per molecule reactive with said isocyanate groups of said isocyanate component; and
a second isocyanate-reactive component having one or more hydroxyl-functional groups reactive with said free isocyanate-functional groups of said isocyanate component, wherein the ratio of free isocyanate-functional groups of said isocyanate component to said hydroxyl-functional groups of said second-reactive isocyanate-reactive component ranges from 0.75:1 to 3.0:1, said second isocyanate-reactive component comprising, based on the total weight of the second isocyanate-reactive component:
  from 25 to 90 weight percent of a hydroxyl-functional polymer component having an average of from 1.5 to 7 hydroxyl groups per molecule,
  from 0 to 5 weight percent of an ethylene diamine-initiated polyether polyol crosslinker having an average of 4 hydroxyl groups per molecule;
  from 0 to 10 weight percent of a glycerine-initiated or dipropylene glycol-initiated polyether polyol crosslinker having an average of 2 to 3 hydroxyl groups per molecule and having a weight average molecular weight ranging from 25 to 6,000 g/mol;
  from 0.5 to 5 weight percent of a silicone surfactant,
  from 25 to 75 weight percent of a primary amine, and
  from 0.15 to 20 weight percent of water,
wherein the sprayable low rise adhesive composition has a viscosity 100 to 3,000 cP at 25° C. according to ASTM D2196, and
wherein the monomeric MDI content of the sprayable low rise adhesive composition, when spray applied in the area of spray application, is no more than 50 parts per billion in the area of spray application in any time period as measured in accordance with PEL Method 47.

In further embodiments, the sprayable monomeric MDI content of the sprayable low rise adhesive composition, in addition to meeting the OSHA's PEL standards of no more than 20 ppb at any given time measured in accordance with PEL Method 47, also produces a time weighted average monomeric MDI content value over an eight hour period (TLV-TWA) of no more than 5, and alternatively less then 4, 3, 2, or 1, parts of the monomeric MDI per one billion parts of air (ppb) as also measured in accordance with PEL Method 47, as established by ACGIH TLV-TWA, when spray applied and measured under the same conditions.

In further embodiments, the sprayable low rise adhesive composition has a viscosity of from 100 to 3,000 cP, such as from 200 to 2,500 cP, such as between 200 to 2,500 cP, such as from 200 to 2,000 cP, at 25° C. as measured according to ASTM D2196.

Still further, in certain embodiments, the isocyanate component and the second isocyanate-reactive component of the SPF sprayable low rise adhesive composition each have a respective viscosity of from 100 to 3,000 cP, such as from 200 to 2,500 cP, such as between 200 to 2,500 cP, such as from 200 to 2,000 cP, at 25° C. as measured according to ASTM D2196.

Still further, in certain embodiments, the isocyanate component of the sprayable low rise adhesive composition has a viscosity of from 100 to 8,000 cP, such as from 100 to 8,000 cP, such as from 200 to 2,500 cP, such as between 200 to 2,500 cP, such as from 200 to 2,000 cP, at 25° C. as measured according to ASTM D2196

Still further, in certain embodiments, the LRA composition also includes a viscosity reducer that is present in an amount of from greater than 0 to 30 weight percent based on the total weight of the SPF composition.

Even still further, in certain embodiments, the LRA composition also includes a second blowing agent present in an amount of from greater than 0 to 30 weight percent or 0 to 20 weight percent based on the total weight of the SPF composition.

Each of the representative components of the LRA composition, in each of their respective relative amounts, is described in further detail immediately below.

a. Isocyanate Component

As noted above, in each of the respective formulations for the LRA composition, an isocyanate component is included which comprises an isocyanate-containing compound and optionally includes a first isocyanate-reactive component and a viscosity reducer.

The isocyanate component includes free isocyanate-functional groups (free NCO-functional groups) that react with free hydroxyl-functional groups (free OH-functional groups) from the first and second isocyanate-reactive components to form carbamate (i.e., urethane) linkages, and hence form a polyurethane composition (i.e., a polymer composition have urethane linkages (sometimes referred to as urethane bonds).

In certain embodiments, as noted above, the isocyanate component has a viscosity of from 100 to 8,000 cP, such as from 100 to 3,000 cP, such as from 200 to 2,500 cP, such as between 200 to 2,500 cP, such as from 200 to 2,000 cP, at 25° C. as measured according to ASTM D2196. In this way, the first isocyanate component is liquid enough to be sprayed though spray application equipment associated with spraying SPF compositions.

The composition of the isocyanate component, in certain embodiments, is the same as the composition of the isocyanate component described above with respect to the SPF composition. Accordingly, the composition of the isocyanate component of the LRA composition includes each of the possible isocyanate-containing compound, first isocyanate reactive component and viscosity reducer that are described above, and not repeated herein, with respect to the SPF composition.

b. The Second Isocyanate-Reactive Component

As noted above, the LRA composition also include a second isocyanate-reactive component.

In certain embodiments, the amount of the second isocyanate-reactive component added to the isocyanate component is set such that the ratio of free isocyanate-functional groups of the isocyanate component to the hydroxyl-functional groups of the second isocyanate-reactive component (i.e., the NCO:OH ratio) ranges from 0.20:1 to 3.0:1.

In certain embodiments, the second isocyanate-reactive component has a from 100 to 3,000 cP, such as from 200 to 2,500 cP, such as between 200 to 2,500 cP, such as from 200 to 2,000 cP, and more typically of from 200 to 1500 cP, measured at 25° C. according to ASTM D2196 using a Brookfield Viscometer.

In certain embodiments, the second isocyanate-reactive component of the LRA composition comprises, based on the total weight of the second isocyanate-reactive component:
  from 25 to 90 weight percent of a hydroxyl functional polymer component having an average hydroxyl functionality, per molecule, of from 1.5 to 7;
  from 0 to 5 weight percent of an ethylene diamine-initiated polyether polyol crosslinker having an average of 4 hydroxyl groups per molecule;
  from 0 to 10 weight percent of a glycerine-initiated or dipropylene glycol-initiated polyether polyol crosslinker having an average of 2 to 3 hydroxyl groups per molecule and having a weight average molecular weight ranging from 25 to 6,000 g/mol;
  from 0.5 to 5 weight percent of a silicone surfactant,
  from 25 to 75 weight percent of a primary amine, and
  from 0.15 to 20 weight percent of water.

As noted above, in certain embodiments, the second isocyanate-reactive component includes a hydroxyl-functional polymer component having an average hydroxyl functionality, per molecule, of from 1.5 to 7 that is present in an amount of from 25 to 90 weight percent based on the total weight of the second isocyanate-reactive component.

Suitable hydroxyl-functional polymer components, having an average hydroxyl functionality, per molecule, of from 1.5 to 7, includes many of the hydroxyl-functional polymers described above with respect to the first isocyanate-reactive component of the SPF composition above, including but not limited to the hydroxyl-functional polyethers and polyesters, and combinations thereof, as described above, and herein incorporated by reference.

The second isocyanate-reactive component may also include from 0 to 5 weight percent (based on the total weight of the second isocyanate-reactive component), such as from 1 to 3 weight percent, of an ethylene diamine-initiated polyether polyol crosslinker having an average of 4 hydroxyl groups per molecule.

One suitable ethylene diamine-initiated polyether polyol crosslinker is Quadrol, available from BASF Corporation of Florham Park, New Jersey The second isocyanate-reactive component may also include from 0 to 10 weight percent (based on the total weight of the second isocyanate-reactive component), such as from 2 to 5 weight percent, of a glycerine-initiated or dipropylene glycol-initiated polyether polyol crosslinker having an average of 2 to 3 hydroxyl groups per molecule and having a weight average molecular weight ranging from 25 to 6,000 g/mol.

Suitable glycerine-initiated or dipropylene glycol-initiated polyether polyol crosslinker having an average of 2 to 3 hydroxyl groups per molecule and having a weight average molecular weight ranging from 25 to 6,000 g/mol include Pluracol 1062, Pluracol 2010, and Pluracol 726 from BASF Corporation, as well as Carpol GP 5015 and GP 700 from Carpenter.

The second isocyanate-reactive component also includes from 0.5 to 5 weight percent (based on the total weight of the second isocyanate-reactive component), such as from 0.5 to 3 weight percent, such as from 0.5 to 1.5 weight percent, of a silicone surfactant.

Suitable silicone surfactants include, but are not limited to, Tegostab B8408 (Evonik), Silstab 2100 (Siltech), Silstab L6900 (Siltech), Silstab L580 (Siltech), and Dabco DC193 (Evonik).

The second isocyanate-reactive component also includes from 25 to 75 weight percent (based on the total weight of the second isocyanate-reactive component), such as from 30 to 50 weight percent, of a primary amine.

Suitable primary amines include primary aliphatic amines, such as Jeffamine D2000, and primary aromatic amines, such as Ethacure 100.

The second isocyanate-reactive component also includes from 0.15 to 20 weight percent (based on the total weight of the second isocyanate-reactive component), such as from 0.2 to 3.0 weight percent, of water.

3. Polyurethane Spraying System and Method of Application of SPF and LRA Composition In further embodiments, a corresponding method for forming a multi-layer structure for construction applications using the spray polyurethane foam composition or low rise adhesive composition is provided. The multi-layer structure, shown as 15 in FIG. 2, includes the cured SPF composition 16 in the form of a polyurethane foam layer, or cured LRA composition 17 in the form of a polyurethane layer, disposed between a first substrate material 18 and a second substrate material 19. The first substrate material 18 corresponds to any structure of a residential or commercial structure or building as described above, such as the wall, floor or roof of the building. Such a structure may be, but is not limited to, brick, concrete, masonry, dry-wall, sheetrock, plaster, metal, stone, wood, plastic, a polymer composite, or combinations thereof. It is also contemplated that the surface upon which the mixture is sprayed may be a surface of a vehicle or machine component. Similarly, the second substrate material 19 can be formed from the same, or different, materials described above with respect to the first substrate material 18.

In general, a polyurethane spraying system (hereinafter alternatively referred to as the "system") is provided and has separate vessels fluidically coupled to a applicator portion, with the formed isocyanate component and second isocyanate-reactive component of either the spray polyurethane foam composition or low rise adhesive first introduced to a respective vessel. Next, the isocyanate component and the second isocyanate-reactive component are premixed in the applicator portion of the polyurethane spraying system to form a mixture (i.e., to form the SPF composition or the LRA composition) having a viscosity of from 100 to 3,000 cP (or any of the nested ranges as described above) at 25° C. according to ASTM D2196. The mixture is then applied onto a surface 18A of the provided first substrate material 18 confined within a spray application area followed by the application of a second substrate material 19 onto the applied mixture opposite the first substrate material 18. During this process, the applied mixture is curing to form the cured SPF composition 16 in the form of a polyurethane foam layer, or to form the cured LRA composition 17 in the form of a polyurethane layer, that is disposed between the first and second substrate materials 18, 19. In certain embodiments, the cured SPF composition 16 or cured LRA composition 17 are bonded to one, or both, of the first and second substrate materials 18, 19.

The system, in conjunction with the compositions of the isocyanate component and the second isocyanate-reactive component, are collectively configured to limit monomeric MDI content applied onto the substrate within the spray application area to no more than 50 parts per billion as measured in accordance PEL Method 47. In addition, in certain embodiments, the system limit monomeric MDI content applied onto the substrate within the spray application area to no more than 20 ppb in a time weighted average over an 8 hour periods (TLV-TWA).

Figure 2:
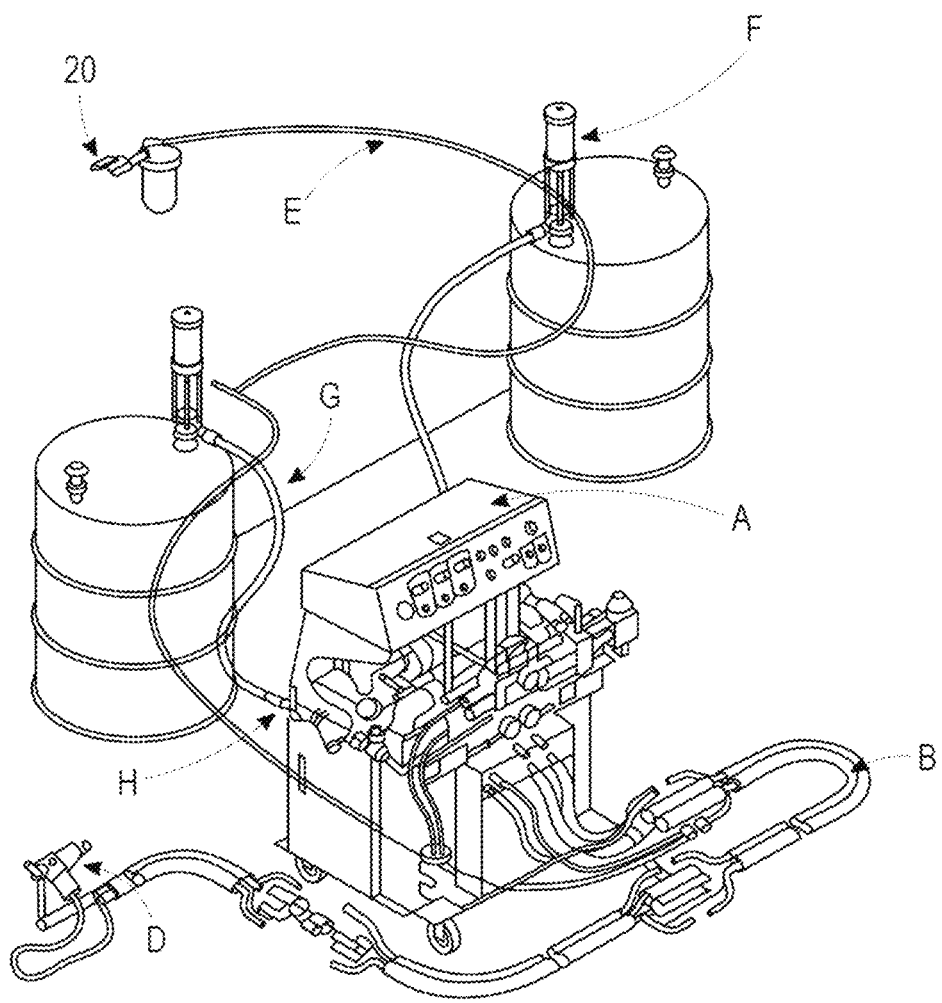
FIG. 2 is a schematic of one embodiment of a polyurethane spraying system of this disclosure.

A non-limiting schematic of one embodiment of the polyurethane spraying system used for applying the SPF foam composition in accordance with the method is set forth in FIG. 2 wherein (A) is one embodiment of a proportioner or mixer, (B) is a heated hose, (C) is a heated whip hose, (D) is a fusion spray gun, (E) is an air line, (F) is a feed pump, (G) is a fluid supply line, and (I) is a fluid inlet. The system is used to minimize emissions of the monomeric MDI, in conjunction with the formulations of the instant disclosure, while spraying the mixture of the isocyanate component and the second isocyanate reactive component onto the surface. The system includes a first reactant supply tank that includes the second isocyanate reactive component and a second reactant supply tank that includes the isocyanate component. The first and second reactant supply tanks may be any known in the art such as totes, drums, and tanks, and may be any size and shape. Typically, the first and second reactant supply tanks have a capacity of from 150 pounds to 40,000 pounds. The first and second reactant supply tanks are typically transportable and light-weight such that they can be easily utilized in a variety of applications. Alternatively, the first and second reactant supply tanks may be permanent and not moveable. It is also contemplated that the system may include more than two reactant supply tanks. For example, third and fourth, (or more) reactant supply tanks may be utilized and may include additional isocyanates, hydroxyl-functional polymers, or additives, in addition to those described above. Typically, the contents of both the first and second reactant supply tanks have a viscosity of less than or equal to about 2000 cps when measured at 25° C. as noted above.

The system also includes a non-gaseous pump, i.e., a pump that does not utilize a gas to pump, push, or move the contents of the first and second reactant supply tanks. The non-gaseous pump is not particularly limited and may be further defined as a piston pump, an opposed piston metering pump, a double acting piston pump, a pneumatic pump, a direct lift pump, a gravity pump, a hydraulic pump, a positive displacement pump such as a gear pump, a progressive cavity pump, a roots-type pump, a peristaltic pump, a reciprocating-type pump, an impulse pump, a hydraulic ram pump, a velocity pump, a centrifugal pump, a radial flow pump, an axial flow pump, a mixed flow pump, an eductor-jet pump, a steam pump, a valveless pump, a rotary pump, a screw pump, a rotary gear pump, a diaphragm pump, a vane pump, etc.

Typically, the non-gaseous pump is in fluid communication with both the first and second reactant supply tanks and may supply a pressure of from 100-500 psi, of from about 200 to 250 psi, of from about 250 to 500 psi, or of about 235 psi. In one embodiment, the system includes a pumping metering unit that can be operated at a pressure of about 200 to 250 psi. In another embodiment, the pressure can reach 3,500 psi.

The system also includes a mixing apparatus (or more than one mixing apparatus), e.g. a proportioner, that is coupled with the first and second reactant supply tanks and coupled with the non-gaseous pump for mixing the second isocyanate-reactive component and isocyanate component prior to spraying. The mixing apparatus is typically coupled and in fluid communication with the first and second reactant supply tanks via connecting means such as hoses, valves, and/or fluid lines. In one embodiment, the connecting means is heated to a temperature of from 20° C. to 55° C. The mixing apparatus is also typically coupled with the non-gaseous pump via connecting means that may be the same or different from the connecting means described above.

In an alternative embodiment, the one or more mixing apparatus is coupled and in fluid connection with the first and second reactant supply tanks through a ratio control device. The ratio control device may be further defined as a gear box that is used to monitor and control the ratio of the contents of the first and second reactant supply tanks. The one or more mixing apparatus may also be coupled and in fluid connection with the first and second reactant supply tanks through a flow controller. The flow controller and the ratio control device may be coupled and in fluid connection with each other. Typically, the flow controller controls a flow of the contents of the first and second reactant supply tanks. Commercially available low pressure systems, including NitroSYS, and low pressure kits such as those from ICP adhesives (Handifoam) can also be used.

The mixing apparatus may be further defined as a plural component proportioner, as is known in the art. Suitable, but non-limiting, examples of mixing apparatuses are commercially available from Graco Inc. of Minneapolis, MN, under the trade names of Reactor E-XP1 and E-XP2, Reactor E-10, Reactor H-XP2 and H-XP3, Reactor H-VR, Guardian A-6, Reactor E-20 and E-30, Reactor E-10, Reactor H-25, H-40 and H-50, Reactor A-20, Guardian A-5, Gusmer H-20/35, Gusmer-Decker Proportioners. Additional non-limiting examples of mixing apparatuses, and more general spray-foam systems that can utilize one or more embodiments of the instant disclosure, include SPRAYTITE 178, and ENERTITE NM, as set forth in the art. In fact, the mixing apparatuses and general spray-foams systems which may utilize one or more embodiments of the instant disclosure are not particularly limited. The non-gaseous pump of this disclosure may be further defined as a pump of one or more of these apparatuses. The components, designs, orientations, operations, and specifications of each of the aforementioned mixing apparatuses, and the non-gaseous pumps included therein, are expressly contemplated as suitable for use in this disclosure and as optional components in this disclosure. Individual descriptions of each of these components are not included herein for the sake of brevity but nonetheless remain as contemplated non-limiting options for use in this disclosure.

In addition, the system includes the spray nozzle (20) as a part of its applicator portion, which may be as described above and/or below. The spray nozzle (20) is coupled with the mixing apparatus and minimizes emissions of monomeric MDI while spraying the mixture onto the surface. The spray nozzle (20) is typically further defined as a cone nozzle or a fan nozzle. Particularly suitable cone nozzles include, but are not limited to, full cone nozzles, hollow cone nozzles, and combinations thereof. Particularly suitable fan nozzles include, but are not limited to, flat fan nozzles, flooding fan nozzles, and combinations thereof. Of course, any spray nozzle known in the art may be used with the system so long as the mixture is sprayed as described above and the spray nozzle minimizes the emissions of the monomeric MDI upon spraying. The spray nozzle (20) also typically has a spraying orifice defined by the nozzle body and disposed at the downstream end of the nozzle body transverse to the longitudinal axis for spraying the mixture. The spraying orifice may be of any size and shape but typically is circular and has a radius of from about 0.01 to about 0.25 inches.

In addition, the system may also include any other typical components such as air-bleed valves, water-flushes, air blow offs, filters, and the like. These components may be selected by one of skill in the art and used at any appropriate point in the system. In one embodiment, the system includes a series of regulators and valves. The elements of the spray system can be "coupled" to each other by any means known in the art including piping, tubing, with supply lines, and the like, as selected by one of skill in the art.

While the polyurethane spraying system of FIG. 2 is directed for use to the SPF composition, it is contemplated that the same or a similar polyurethane spraying system may also be used to apply the LRA composition. In either system, the combination of the polyurethane spraying system and the respective SPF composition, or LRA composition, is configured such that the monomeric MDI content in the spray application area, during spray application, is to be no more than 50 parts per billion as measured in accordance PEL Method 47, and in certain embodiments to be no more than 20 parts per billion in a time weight average TLV-TWA over an eight hour period.

The instant disclosure thus solves an environmental issue surrounding the exposure to monomeric MDI upon spray application as governed by OHSA and ACGIH (the American Conference of Governmental Industrial Hygienists), as well as various state environmental agencies. With the risk of exposure to monomeric MDI substantially reduced, workplace productivity (in terms of quicker reoccupancy times) and speed of construction can increase.

EXAMPLES

Spray Polyurethane Foam

Preparation of Prepolymer Reactions

To prepare the prepolymer for use in evaluating the present invention, an isocyanate (PMDI as shown in Table 1)) was charged to a reactor and heated to 60° C. The polyol or mono-alcohol (2 ethyl hexanol (2EH) as shown in Table 1) was subsequently added slowly to the isocyanate to control the exotherm. Upon complete addition of alcohol to the flask, the reaction was heated to 80° C. and reacted for 1 hour. After which, the solution cooled, drained from the reactor and stored until use (the properties of the resultant isocyanate prepolymer as also shown in Table 1). If needed, a blowing agent was added to the prepolymer prior to use in spray application.

System 1. SPF Composition (1) Sprayed with Controlled Air Flow and Monitored Using ASSET EZ4-NCO Monitors.

Graco H-VR was used, with hydraulic pressures of 1000-1200 psi, temperatures of 130° F. (about 55° C.). The system (SPF system in Table 1 and 2) was sprayed continuously for 15 minutes in a booth with controlled airflow ranging from 10 ACH (air changes/hour) to 20 ACH. ASSET EZ4-NCO monitors were used on both the applicator as well as situated behind the applicator by ~3 feet (about 1 meter) to capture an area measurement. Monitors were sent out for analysis.

TABLE 1

| Isocyanate Prep | % | |
|---|---|---|
| PMDI | 85 | M70L |
| Reactive, polyol or monol | 15 | 2-ethylhexanol |
| Total | 100 | |
| Properties | | |
| % fNCO | 21.1 | |
| Viscosity, cP, 25° C. | 8,500 | |
| % mMDI (4.4 + 2.4) | 13.9 | |

TABLE 2

| System 1 | | |
|---|---|---|
| Isocyanate | | |
| Prepared Isocyanate Prepolymer | 94 | M70L + 15% 2EH |
| Blowing Agent | 6 | Solstice LBA |
| Total | 100 | |
| Resin | | |
| Polyol 1 | 51.6 | Aromatic Polyester, Terol 258 |
| Polyol 2 | 20.0 | SPA357 |
| Fire Retardant, reactive | 7.5 | PHT4Diol |
| Surfactant | 1.5 | Dabco DC193 |
| Catalyst 1, blowing | 2.0 | Dabco T |
| Catalyst 2, gelling | 1.0 | Metal, BorchiKat 320 |
| Diamine | 5.0 | Ethacure 100 |
| Blowing Agent | 11.0 | Solstice LBA |
| Water | 0.4 | |
| Total | 100.0 | |

TABLE 3

| Results | 20 ACH | 10 ACH |
|---|---|---|
| Monomeric MDI, ppb, Applicator | 15 | 14 |
| | 13 | 10 |
| Monomeric MDI, ppb, Area | 4.3 | 2.5 |
| | 3.9 | 4.1 |

Figure 3:
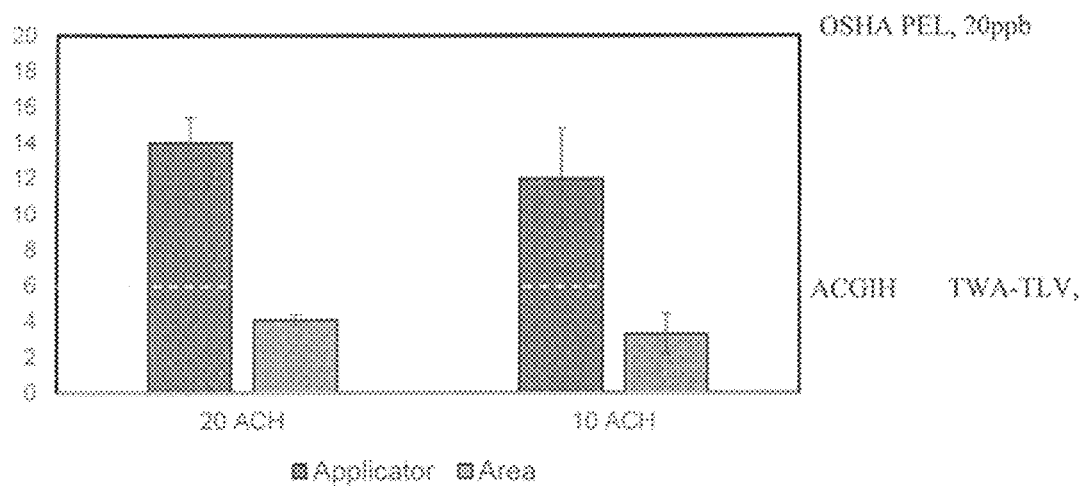
FIG. 3 is graph comparing the monomeric MDI content with a personal monitor and an area monitor spray polyurethane foam compositions of Table 2 formed in accordance with the instant disclosure with controlled airflow ranging from 10 ACH (air changes/hour) to 20 ACH and monitored with Asset EZ-4 NCO monitors.

Results comparing monomeric MDI content for 10 ACH and 20 ACH at the applicator, and in the area about 3 feet behind the applicator, are shown graphically in FIG. 3, and confirm the systems meet the monomeric MDI content requirements of less than 20 parts per billion in accordance with the OSHA standards.

System 2. SPF Composition (2) Sprayed with Passive Air Flow and Monitored Using Impingers.

Gusmer H20/35 was used, with hydraulic pressures of 1000-1200 psi, temperatures of 130° F. (about 55° C.). The system (SPF compositions of System 2) was sprayed continuously for 15 minutes in a booth with passive airflow. Impingers were used to monitor the applicator, as well as set up 10 feet away from the applicator.

TABLE 4

System 2

| Isocyanate | | |
|---|---|---|
| Prepared Isocyanate Prepolymer | 92 | M70L + 15% 2EH |
| Blowing Agent | 8 | Opteon 1100 |
| Total | 100 | |

| Resin | | |
|---|---|---|
| Polyol 1 | 45.11 | Aromatic Polyester, Terol 258 |
| Polyol 2 | 23.74 | GSP-280 |
| Fire Retardant, reactive | 5.0 | PHT4Diol |
| Fire Retardant, non-reactive | 5.0 | TEP |
| Surfactant | 1.5 | Tegostab B8453 |
| Catalyst 1, amine | 2.5 | Dabco 33LV |
| Catalyst 2, amine | 0.5 | Dabco T |
| Catalyst 3, amine | 2.5 | DMEA |
| Catalyst 4, metal | 1.0 | Dabco T120 |
| Diamine | 5.0 | Ethacure 100 |
| Blowing Agent | 8.0 | Opteon 1100 |
| Water | 0.15 | |
| Total | 100.0 | |

Figure 4:
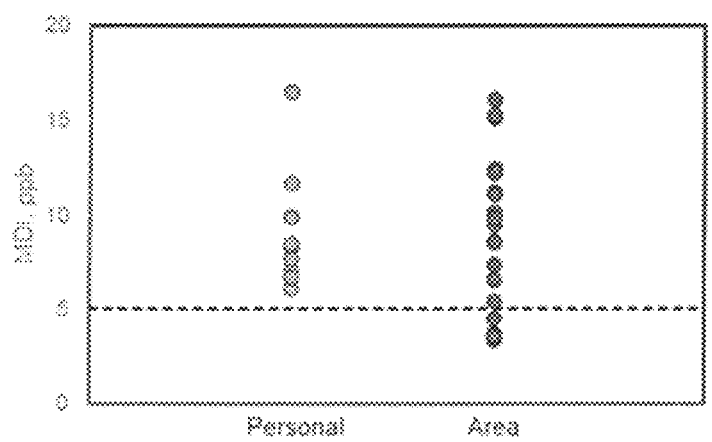
FIG. 4 is graph comparing the monomeric MDI content with a personal monitor and an area monitor spray polyurethane foam compositions of Table 4 formed in accordance with the instant disclosure sprayed with passive air flow and monitored using impingers.

In an effort to explore reproducibility, the experiment was repeated 11 times. For each 15 minute run, a personal monitor and two area monitors were used to generate more data. The results shown in FIG. 4 display the range of monomeric MDI content from 5.7 to 16.4 parts per billion for personal and 3.3 to 15.2 parts per billion for area, both systems meeting monomeric MDI content requirements of less than 20 parts per billion in accordance with the OSHA standards.

The instant disclosure has been described herein in an illustrative manner, and it is to be understood that the terminology which has been used is intended to be in the nature of words of description rather than of limitation. Obviously, many modifications and variations of the instant disclosure are possible in light of the above teachings. The invention may be practiced otherwise than as specifically described within the scope of the appended claims.

What is claimed is:

1. A sprayable polyurethane foam (SPF) composition, comprising:
    an isocyanate component having free isocyanate-functional groups and comprising a reaction product of based on the total weight of the isocyanate component:
        from 50 to 100 weight percent of an isocyanate-containing compound comprising polymeric diphenylmetharte, diisocyanate (PMDI), wherein a monomeric diphenylmethane diisocyanate (monomeric MDI) content of said PMDI ranges from 10 to 90 weight percent based on 100 parts by weight of said PMDI, and
        from 0 to 50 weight percent of a first isocyanate-reactive component having one or more hydroxyl-functional groups per molecule reactive with said isocyanate groups of said isocyanate component; and
    a second isocyanate-reactive component having one or more hydroxyl-functional groups reactive with said free isocyanate-functional groups of said isocyanate component and having a viscosity of 100 to 3,000 cP at 25° C., wherein the ratio of free isocyanate-functional groups of said isocyanate component to said hydroxyl-functional groups of said second-reactive isocyanate-reactive component ranges from 0.25:1 to 3.0:1, said second isocyanate-reactive component comprising, based on the total weight of the second isocyanate-reactive component:
        from 20 to 90 weight percent of a hydroxyl-functional polymer component having an average hydroxyl functionality, per molecule, of from 1.5 to 7, said hydroxyl-functional polymer component comprising, based on the total weight of the hydroxyl-functional polymer component:
            from 0 to <40 weight percent of a tire retardant component,
            from 1 to 10 weight percent of a silicone surfactant,
            from 0 to 20 weight percent of a diamine,
            from 0.5 to 15 weight percent of a catalyst, and
            from 0 to 25 weight percent of a first blowing agent; and
    wherein the viscosity of the sprayable polyurethane foam composition is from 100 to 3,000 cP at 25° C. according to ASTM D2196, and
    wherein the monomeric MDT content of the sprayable polyurethane composition is no more than 50 parts per billion in the area of spray application in any time period as measured in accordance with PEL Method 47.

2. The sprayable polyurethane foam (SPF) composition according to claim 1, wherein the monomeric MDI content of the sprayable polyurethane foam composition-produces a time weighted average monomeric MDI content value over an eight hour period (TLV-TWA) of no more than 20 parts per billion as measured in accordance with PEL Method 47.

3. The sprayable polyurethane foam (SPF) composition according to claim 1, wherein said isocyanate component further comprises a viscosity reducer present in an amount of from greater than 0 to 30 weight percent of the total weight of said isocyanate component.

4. The sprayable polyurethane foam (SPF) composition according to claim 1, wherein said isocyanate component further comprises a second blowing agent present in an amount of from greater than 0 to 30 weight percent of the total weight of said isocyanate component.

5. The spray able polyurethane foam (SPF) composition according to claim 4, wherein said second blowing agent comprises at least one of the group consisting of a hydrofluoroolefin, a hydrofluorocarbon, a hydrocarbon, and any combination thereof.

6. The sprayable polyurethane foam (SPF) composition according to claim 1, wherein said first isocyanate-reactive component is present in said isocyanate component and comprises at least one of the group consisting of:
    a hydroxyl-functional aliphatic polyether having an average hydroxyl functionality, per molecule, of from 2 to 3;
    a hydroxyl-functional aromatic polyester having an average hydroxyl functionality, per molecule, of from 2 to 3;

a monohydric alcohol;
a first reactive fire retardant having an average hydroxyl functionality, per molecule, of from 1 to 3; and
any combination thereof.

7. The sprayable polyurethane foam (SPF) composition according to claim 6,
wherein said first reactive fire retardant is present in said first isocyanate-reactive component and
comprises at least one of the group consisting of:
an aromatic brominated compound;
an aliphatic brominated compound;
a phosphorus-containing fire retardant; and
any combination thereof.

8. The sprayable polyurethane foam (SPF) composition according to claim 1, wherein said hydroxyl-functional polymer component comprises, based on the total weight of said hydroxyl-functional polymer component:
from 20 to 80 weight percent of a hydroxyl-functional aromatic polyester having an average hydroxyl functionality, per molecule, of from 1.5 to 7,
from 0 to 40 weight percent of a Mannich polyether polyol having an average hydroxyl functionality, per molecule, of from 2 to 3, and
from 0 to 40 weight percent of a polyether polyol different from said Mannich polyether polyol and having an average hydroxyl functionality, per molecule, of from 2 to 3.

9. The sprayable polyurethane foam (SPF) composition according to claim 1, wherein said fire retardant component is present in said second isocyanate-reactive component and comprises, based on the total weight of said fire retardant component:
from 0 to 50 weight percent of a second reactive fire retardant component having an average of from 1 to 3 hydroxyl groups per molecule, the second reactive fire retardant component the same or different from said first reactive fire retardant component, and
from 50 to 100 weight percent of non-reactive fire retardant component.

10. The sprayable polyurethane foam (SPF) composition according to claim 9, wherein said second reactive fire retardant is present in said second isocyanate-reactive component.

11. The sprayable polyurethane foam (SPF) composition according to claim 1, wherein said diamine is present in said second isocyanate-reactive component and comprises an aromatic diamine or an aliphatic diamine.

12. The sprayable polyurethane foam (SPF) composition according to claim 1, wherein said catalyst comprises an amine catalyst.

13. The sprayable polyurethane foam (SPF) composition according to claim 1, wherein said catalyst comprises, based on the total weight of the second isocyanate-reactive component:
from 10 to less than 15 weight percent of an amine catalyst, and
from greater than 0 to 5 weight percent of a metal catalyst.

14. The sprayable polyurethane foam (SPF) composition according to claim 1, wherein first blowing agent is present in said second isocyanate-reactive component and comprises at least one of the group consisting of a hydrofluoroolefin, a hydrofluorocarbon, a hydrocarbon, water, formic acid, and any combination thereof.

15. A sprayable low rise adhesive (LRA) composition comprising:
an isocyanate component having free isocyanate-functional groups and comprising a reaction product of, based on the total weight of the isocyanate component
from 50 to 100 weight percent of an isocyanate-containing compound comprising polymeric diphenylmethane diisocyanate (PMDI), wherein a monomeric diphenylmethane diisocyanate (monomeric MDI) content of said PMDI ranges from 10 to 90 weight percent based on 100 parts by weight of said PMDI, and
from 0 to 50 weight percent of a first isocyanate-reactive component having one or more hydroxyl-functional groups per molecule reactive with said isocyanate groups of said isocyanate component; and
a second isocyanate-reactive component having one or more hydroxyl-functional groups reactive with said free isocyanate-functional groups of said isocyanate component and having a viscosity of 100 to 3.000 cP at 25° C., wherein the ratio of free isocyanate-functional groups of said isocyanate component to said hydroxyl-functional groups of said second-reactive isocyanate-reactive component ranges from 0.75:1 to 3.0:1, said second isocyanate-reactive component comprising, based on the total weight of the second isocyanate-reactive component:
from 25 to 90 weight percent of a hydroxyl-functional polymer component having an average of from 1.5 to 7 hydroxyl groups per molecule;
from 0 to 5 weight percent of an ethylene diamine-initiated polyether polyol crosslinker having an average of 4 hydroxyl groups per molecule;
from 0 to 10 weight percent of a glycerine-initiated or dipropylene glycol-initiated polyether polyol crosslinker having an average of 2 to 3 hydroxyl groups per molecule and having a weight average molecular weight ranging from 25 to 6,000 g/mol;
from 0.5 to 5 weight percent of a silicone surfactant, from 25 to 75 weight percent of a primary amine; and
from 0.15 to 20 weight percent of water,
wherein the viscosity of the sprayable low rise adhesive composition is from 100 to 3,000 cP at 25° C. according to ASTM D2196, and
wherein the monomeric MDI content of the sprayable low rise adhesive composition is no more than 50 parts per billion in the area of spray application in any time period as measured in accordance with PEL Method 47.

16. The sprayable low rise adhesive composition according to claim 15, wherein the monomeric MDI content of the sprayable low rise adhesive composition produces a time weighted average monomeric MDI content value over an eight hour period (TLV-TWA) of no more than 20 parts per billion as measured in accordance with PEL Method 47.

17. The sprayable low rise adhesive composition according to claim 15, wherein said isocyanate component further comprises a viscosity reducer present in an amount of from greater than 0 to 30 weight percent of the total weight of said isocyanate component.

18. The sprayable low rise adhesive composition according to claim 15, wherein said first isocyanate-reactive component is present in said isocyanate component and comprises at least one of the group consisting of:
a hydroxyl-functional aliphatic polyether having an average hydroxyl functionality, per molecule, of from 2 to 3;
a hydroxyl-functional aromatic polyester having an average hydroxyl functionality, per molecule, of from 2 to 3;

a monohydric alcohol;

a reactive fire retardant having an average hydroxyl functionality, per molecule, of from 1 to 3; and any combination thereof.

19. The spray able low rise adhesive composition according to claim 18, wherein said reactive fire retardant is present in said first isocyanate-reactive component and comprises at least one of the group consisting of:

an aromatic brominated compound;

an aliphatic brominated compound;

a phosphorus-containing fire retardant; and any combination thereof.

20. The sprayable low rise adhesive composition according to claim 15, wherein said hydroxyl-functional polymer component comprises an ethylene oxide-terminated poly ether diol or triol having a weight average molecular weight ranging from 25 to 6,000 g/mol.

21. A method of forming a multi-layer structure for construction applications, comprising:

forming an isocyanate component and a second isocyanate-reactive component according to claim 1;

introducing the formed isocyanate component and the formed second isocyanate-reactive component to separate vessels of a polyurethane spraying system, each of the vessels fluidically coupled to an applicator portion, forming a spray polyurethane foam composition by pre-mixing the isocyanate component and the second isocyanate-reactive component in the applicator portion of the polyurethane spraying system, the mixture having a viscosity of from 100 to 3,000 cP at 25° C. according to ASTM D2196;

providing a first substrate material confined within a spray application area;

applying the spray polyurethane foam composition onto the first substrate material from the applicator portion within the spray application area, and applying a second substrate material onto the applied spray polyurethane foam composition opposite the first substrate material to form a multi-layer structure, wherein the monomeric MDI content of the sprayable polyurethane composition is no more than 50 parts per billion in the area of spray application in any time period as measured in accordance with PEL Method 47.

\* \* \* \* \*